United States Patent
Farrow et al.

(10) Patent No.: US 10,971,884 B2
(45) Date of Patent: Apr. 6, 2021

(54) FIBER SOURCE WITH CASCADED GAIN STAGES AND/OR MULTIMODE DELIVERY FIBER WITH LOW SPLICE LOSS

(71) Applicant: nLIGHT, Inc., Vancouver, WA (US)

(72) Inventors: Roger L. Farrow, Vancouver, WA (US); Dahv A. V. Kliner, Portland, OR (US)

(73) Assignee: NLIGHT, INC., Vancouver, WA (US)

( * ) Notice: Subject to any disclaimer, the term of this patent is extended or adjusted under 35 U.S.C. 154(b) by 453 days.

(21) Appl. No.: 16/028,694

(22) Filed: Jul. 6, 2018

(65) Prior Publication Data

US 2018/0331488 A1 Nov. 15, 2018

Related U.S. Application Data

(63) Continuation of application No. 15/074,838, filed on Mar. 18, 2016, now Pat. No. 10,050,404.

(Continued)

(51) Int. Cl.
*H01S 3/067* (2006.01)
*G02B 6/255* (2006.01)
(Continued)

(52) U.S. Cl.
CPC .......... *H01S 3/0675* (2013.01); *G02B 6/2551* (2013.01); *G02B 6/264* (2013.01); *G02B 6/4296* (2013.01); *H01S 3/06754* (2013.01)

(58) Field of Classification Search
CPC .. H01S 3/067; H01S 3/06754; H01S 3/06758; H01S 3/06708; H01S 3/06783;
(Continued)

(56) References Cited

U.S. PATENT DOCUMENTS

| 3,388,461 A | 6/1968 | Lins |
| 4,138,190 A | 2/1979 | Bryngdahl |

(Continued)

FOREIGN PATENT DOCUMENTS

| BY | 12235 | 8/2009 |
| CA | 2637535 | 8/2007 |

(Continued)

OTHER PUBLICATIONS

"Canunda, Application Note," CAILabs, available at: www.cailabs.com, 16 pages (Jun. 10, 2015).

(Continued)

*Primary Examiner* — Eric L Bolda
(74) *Attorney, Agent, or Firm* — Michelle Craig

(57) ABSTRACT

An apparatus includes an optical gain fiber having a core, a cladding surrounding the core, the core and cladding defining an optical gain fiber numerical aperture, and a multimode fiber having a core with a larger radius than a radius of the optical gain fiber core, a cladding surrounding the core, the core and cladding of the multimode fiber defining a multimode fiber stable numerical aperture that is larger than the optical gain fiber numerical aperture, the multimode fiber being optically coupled to the optical gain fiber so as to receive an optical beam propagating in the optical gain fiber and to stably propagate the received optical beam in the multimode fiber core with low optical loss associated with the optical coupling.

17 Claims, 4 Drawing Sheets

Related U.S. Application Data

(60) Provisional application No. 62/138,926, filed on Mar. 26, 2015.

(51) Int. Cl.
    *G02B 6/42*     (2006.01)
    *G02B 6/26*     (2006.01)

(58) Field of Classification Search
    CPC ...... G02B 6/14; G02B 6/262; G02B 6/02004; G02B 6/02009
    See application file for complete search history.

(56) References Cited

U.S. PATENT DOCUMENTS

| | | |
|---|---|---|
| 4,252,403 A | 2/1981 | Salisbury |
| 4,266,851 A | 5/1981 | Salisbury |
| 4,475,027 A | 10/1984 | Pressley |
| 4,475,789 A | 10/1984 | Kahn |
| 4,713,518 A | 12/1987 | Yamazaki et al. |
| 4,863,538 A | 9/1989 | Deckard |
| 4,953,947 A | 9/1990 | Bhagavatula |
| 4,998,797 A | 3/1991 | van den Bergh et al. |
| 5,008,555 A | 4/1991 | Mundy |
| 5,082,349 A | 1/1992 | Cordova-Plaza et al. |
| 5,129,014 A | 7/1992 | Bloomberg |
| 5,153,773 A | 10/1992 | Muraki et al. |
| 5,231,464 A | 7/1993 | Ichimura et al. |
| 5,237,150 A | 8/1993 | Karube |
| 5,252,991 A | 10/1993 | Storlie et al. |
| 5,319,195 A | 6/1994 | Jones et al. |
| 5,463,497 A | 10/1995 | Muraki et al. |
| 5,475,415 A | 12/1995 | Noethen |
| 5,475,704 A | 12/1995 | Lomashevich |
| 5,509,597 A | 4/1996 | Laferriere |
| 5,523,543 A | 6/1996 | Hunter, Jr. et al. |
| 5,566,196 A | 10/1996 | Scifres |
| 5,684,642 A | 11/1997 | Zumoto et al. |
| 5,719,386 A | 2/1998 | Hsieh et al. |
| 5,745,284 A | 4/1998 | Goldberg et al. |
| 5,748,824 A | 5/1998 | Smith |
| 5,761,234 A | 6/1998 | Craig et al. |
| 5,818,630 A | 10/1998 | Fermann et al. |
| 5,832,415 A | 11/1998 | Wilkening et al. |
| 5,841,465 A | 11/1998 | Fukunaga et al. |
| 5,864,430 A | 1/1999 | Dickey et al. |
| 5,903,696 A | 5/1999 | Krivoshlykov |
| 5,909,306 A | 6/1999 | Goldberg et al. |
| 5,932,119 A | 8/1999 | Kaplan et al. |
| 5,986,807 A | 11/1999 | Fork |
| 5,999,548 A | 12/1999 | Mori et al. |
| 6,072,184 A | 6/2000 | Okino et al. |
| 6,132,104 A | 10/2000 | Bliss et al. |
| 6,265,710 B1 | 7/2001 | Miller et al. |
| 6,275,630 B1 | 8/2001 | Yang et al. |
| 6,310,995 B1 | 10/2001 | Saini et al. |
| 6,330,382 B1 | 12/2001 | Harshbarger et al. |
| RE37,585 E | 3/2002 | Mourou et al. |
| 6,353,203 B1 | 3/2002 | Hokodate et al. |
| 6,362,004 B1 | 3/2002 | Noblett |
| 6,417,963 B1 | 7/2002 | Ohishi et al. |
| 6,433,301 B1 | 8/2002 | Dunsky et al. |
| 6,434,177 B1 | 8/2002 | Jurgensen |
| 6,434,302 B1 | 8/2002 | Fidric et al. |
| 6,483,973 B1 | 11/2002 | Mazzarese et al. |
| 6,490,376 B1 | 12/2002 | Au et al. |
| 6,496,301 B1 | 12/2002 | Koplow et al. |
| 6,542,665 B2 | 4/2003 | Reed et al. |
| 6,556,340 B1 | 4/2003 | Wysocki et al. |
| 6,569,382 B1 | 5/2003 | Edman et al. |
| 6,577,314 B1 | 6/2003 | Yoshida et al. |
| 6,639,177 B2 | 10/2003 | Ehrmann et al. |
| 6,671,293 B2 | 12/2003 | Kopp et al. |
| 6,711,918 B1 | 3/2004 | Kliner et al. |
| 6,724,528 B2 | 4/2004 | Koplow et al. |
| 6,772,611 B2 | 8/2004 | Kliner et al. |
| 6,777,645 B2 | 8/2004 | Ehrmann et al. |
| 6,779,364 B2 | 8/2004 | Tankala et al. |
| 6,801,550 B1 | 10/2004 | Snell et al. |
| 6,819,815 B1 | 11/2004 | Corbalis et al. |
| 6,825,974 B2 | 11/2004 | Kliner et al. |
| 6,839,163 B1 | 1/2005 | Jakobson et al. |
| 6,882,786 B1 | 4/2005 | Kliner et al. |
| 6,895,154 B2 | 5/2005 | Johnson et al. |
| 6,917,742 B2 | 7/2005 | Po |
| 6,941,053 B2 | 9/2005 | Lauzon et al. |
| 6,963,062 B2 | 11/2005 | Cyr et al. |
| 6,989,508 B2 | 1/2006 | Ehrmann et al. |
| 7,068,900 B2 | 6/2006 | Croteau et al. |
| 7,079,566 B2 | 7/2006 | Kido et al. |
| 7,099,533 B1 | 8/2006 | Chenard |
| 7,099,535 B2 | 8/2006 | Bhagavatula et al. |
| 7,116,887 B2 | 10/2006 | Farroni et al. |
| 7,146,073 B2 | 12/2006 | Wan |
| 7,148,447 B2 | 12/2006 | Ehrmann et al. |
| 7,151,787 B2 | 12/2006 | Kulp et al. |
| 7,151,788 B2 | 12/2006 | Imakado et al. |
| 7,157,661 B2 | 1/2007 | Amako |
| 7,170,913 B2 | 1/2007 | Araujo et al. |
| 7,174,078 B2 | 2/2007 | Libori et al. |
| 7,184,630 B2 | 2/2007 | Kwon et al. |
| 7,193,771 B1 | 3/2007 | Smith et al. |
| 7,196,339 B2 | 3/2007 | Namba et al. |
| 7,218,440 B2 | 5/2007 | Green |
| 7,231,063 B2 | 6/2007 | Naimark |
| 7,235,150 B2 | 6/2007 | Bischel et al. |
| 7,257,293 B1 | 8/2007 | Fini et al. |
| 7,317,857 B2 | 1/2008 | Manyam et al. |
| 7,318,450 B2 | 1/2008 | Nobili |
| 7,349,123 B2 | 3/2008 | Clarke et al. |
| 7,359,604 B2 | 4/2008 | Po |
| 7,373,070 B2 | 5/2008 | Wetter et al. |
| 7,382,389 B2 | 6/2008 | Cordingley et al. |
| 7,394,476 B2 | 7/2008 | Cordingley et al. |
| 7,421,175 B2 | 9/2008 | Varnham |
| 7,463,805 B2 | 12/2008 | Li et al. |
| 7,526,166 B2 | 4/2009 | Bookbinder et al. |
| 7,527,977 B1 | 5/2009 | Fruetel et al. |
| 7,537,395 B2 | 5/2009 | Savage-Leuchs |
| 7,592,568 B2 | 9/2009 | Varnham et al. |
| 7,593,435 B2 | 9/2009 | Gapontsev et al. |
| 7,622,710 B2 | 11/2009 | Gluckstad |
| 7,628,865 B2 | 12/2009 | Singh |
| 7,748,913 B2 | 7/2010 | Oba |
| 7,764,854 B2 | 7/2010 | Fini |
| 7,781,778 B2 | 8/2010 | Moon et al. |
| 7,783,149 B2 | 8/2010 | Fini |
| 7,835,608 B2 | 11/2010 | Minelly et al. |
| 7,839,901 B2 | 11/2010 | Meleshkevich et al. |
| 7,876,495 B1 | 1/2011 | Minelly |
| 7,880,961 B1 | 2/2011 | Feve et al. |
| 7,920,767 B2 | 4/2011 | Fini |
| 7,924,500 B1 | 4/2011 | Minelly |
| 7,925,125 B2 | 4/2011 | Cyr et al. |
| 7,955,905 B2 | 6/2011 | Cordingley et al. |
| 7,955,906 B2 | 6/2011 | Cordingley et al. |
| 8,027,555 B1 | 9/2011 | Kliner et al. |
| 8,071,912 B2 | 12/2011 | Costin, Sr. et al. |
| 8,184,363 B2 | 5/2012 | Rothenberg |
| 8,217,304 B2 | 7/2012 | Cordingley et al. |
| 8,237,788 B2 | 8/2012 | Cooper et al. |
| 8,243,764 B2 | 8/2012 | Tucker et al. |
| 8,251,475 B2 | 8/2012 | Murray et al. |
| 8,269,108 B2 | 9/2012 | Kunishi et al. |
| 8,270,441 B2 | 9/2012 | Rogers et al. |
| 8,270,445 B2 | 9/2012 | Morasse et al. |
| 8,278,591 B2 | 10/2012 | Chouf et al. |
| 8,288,679 B2 | 10/2012 | Unrath |
| 8,288,683 B2 | 10/2012 | Jennings et al. |
| 8,310,009 B2 | 11/2012 | Saran et al. |
| 8,317,413 B2 | 11/2012 | Fisher et al. |
| 8,362,391 B2 | 1/2013 | Partlo et al. |
| 8,395,084 B2 | 3/2013 | Tanaka |
| 8,404,998 B2 | 3/2013 | Unrath et al. |

(56) References Cited

U.S. PATENT DOCUMENTS

| | | |
|---|---|---|
| 8,411,710 B2 | 4/2013 | Tamaoki |
| 8,414,264 B2 | 4/2013 | Bolms et al. |
| 8,415,613 B2 | 4/2013 | Heyn et al. |
| 8,433,161 B2 | 4/2013 | Langseth et al. |
| 8,442,303 B2 | 5/2013 | Cheng et al. |
| 8,472,099 B2 | 6/2013 | Fujino et al. |
| 8,509,577 B2 | 8/2013 | Liu |
| 8,526,110 B1 | 9/2013 | Honea et al. |
| 8,537,871 B2 | 9/2013 | Saracco |
| 8,542,145 B2 | 9/2013 | Galati |
| 8,542,971 B2 | 9/2013 | Chatigny |
| 8,593,725 B2 | 11/2013 | Kliner et al. |
| 8,711,471 B2 | 4/2014 | Liu et al. |
| 8,728,591 B2 | 5/2014 | Inada et al. |
| 8,755,649 B2 | 6/2014 | Yilmaz et al. |
| 8,755,660 B1 | 6/2014 | Minelly |
| 8,774,237 B2 | 7/2014 | Maryashin et al. |
| 8,781,269 B2 | 7/2014 | Huber et al. |
| 8,809,734 B2 | 8/2014 | Cordingley et al. |
| 8,835,804 B2 | 9/2014 | Farmer et al. |
| 8,861,910 B2 | 10/2014 | Yun |
| 8,873,134 B2 | 10/2014 | Price et al. |
| 8,934,742 B2 | 1/2015 | Voss et al. |
| 8,947,768 B2 | 2/2015 | Kliner et al. |
| 8,948,218 B2 | 2/2015 | Gapontsev et al. |
| 8,953,914 B2 | 2/2015 | Genier |
| 9,014,220 B2 | 4/2015 | Minelly et al. |
| 9,136,663 B2 | 9/2015 | Taya |
| 9,140,873 B2 | 9/2015 | Minelly |
| 9,158,066 B2 | 10/2015 | Fini et al. |
| 9,170,359 B2 | 10/2015 | Van Bommel et al. |
| 9,170,367 B2 | 10/2015 | Messerly |
| 9,200,887 B2 | 12/2015 | Potsaid et al. |
| 9,207,395 B2 | 12/2015 | Fini et al. |
| 9,217,825 B2 | 12/2015 | Ye et al. |
| 9,250,390 B2 | 2/2016 | Muendel et al. |
| 9,310,560 B2 | 4/2016 | Chann et al. |
| 9,322,989 B2 | 4/2016 | Fini et al. |
| 9,325,151 B1 | 4/2016 | Fini et al. |
| 9,339,890 B2 | 5/2016 | Woods et al. |
| 9,366,887 B2 | 6/2016 | Tayebati et al. |
| 9,397,466 B2 | 7/2016 | McComb et al. |
| 9,431,786 B2 | 8/2016 | Savage-Leuchs |
| 9,442,252 B2 | 9/2016 | Genier |
| 9,482,821 B2 | 11/2016 | Huber et al. |
| 9,496,683 B1 | 11/2016 | Kanskar |
| 9,507,084 B2 | 11/2016 | Fini et al. |
| 9,537,042 B2 | 1/2017 | Dittli et al. |
| 9,547,121 B2 | 1/2017 | Hou et al. |
| 9,634,462 B2 | 4/2017 | Kliner et al. |
| 9,823,422 B2 | 11/2017 | Muendel et al. |
| 9,837,783 B2 | 12/2017 | Kliner et al. |
| 10,295,845 B2 | 5/2019 | Kliner et al. |
| 10,310,201 B2 | 6/2019 | Kliner |
| 10,423,015 B2 | 9/2019 | Kliner et al. |
| 2002/0097963 A1 | 7/2002 | Ukechi et al. |
| 2002/0146202 A1 | 10/2002 | Reed et al. |
| 2002/0147394 A1 | 10/2002 | Ellingsen |
| 2002/0158052 A1 | 10/2002 | Ehrmann et al. |
| 2002/0159685 A1 | 10/2002 | Cormack |
| 2002/0168139 A1 | 11/2002 | Clarkson et al. |
| 2002/0176676 A1 | 11/2002 | Johnson et al. |
| 2002/0181512 A1 | 12/2002 | Wang et al. |
| 2003/0031407 A1 | 2/2003 | Weisberg et al. |
| 2003/0032204 A1 | 2/2003 | Walt et al. |
| 2003/0043384 A1 | 3/2003 | Hill |
| 2003/0059184 A1 | 3/2003 | Tankala et al. |
| 2003/0095578 A1 | 5/2003 | Kopp et al. |
| 2003/0118305 A1 | 6/2003 | Reed et al. |
| 2003/0152342 A1 | 8/2003 | Wang et al. |
| 2003/0174387 A1 | 9/2003 | Eggleton et al. |
| 2003/0213998 A1 | 11/2003 | Hsu et al. |
| 2003/0219208 A1 | 11/2003 | Kwon et al. |
| 2004/0013379 A1 | 1/2004 | Johnson et al. |
| 2004/0031779 A1 | 2/2004 | Cahill et al. |
| 2004/0086245 A1 | 5/2004 | Farroni et al. |
| 2004/0112634 A1 | 6/2004 | Tanaka et al. |
| 2004/0126059 A1 | 7/2004 | Bhagavatula et al. |
| 2004/0207936 A1 | 10/2004 | Yamamoto et al. |
| 2004/0208464 A1 | 10/2004 | Po |
| 2005/0002607 A1 | 1/2005 | Neuhaus et al. |
| 2005/0017156 A1 | 1/2005 | Ehrmann |
| 2005/0027288 A1 | 2/2005 | Oyagi et al. |
| 2005/0041697 A1 | 2/2005 | Seifert et al. |
| 2005/0168847 A1 | 8/2005 | Sasaki |
| 2005/0185892 A1 | 8/2005 | Kwon et al. |
| 2005/0191017 A1 | 9/2005 | Croteau et al. |
| 2005/0233557 A1 | 10/2005 | Tanaka et al. |
| 2005/0259944 A1 | 11/2005 | Anderson et al. |
| 2005/0265678 A1 | 12/2005 | Manyam et al. |
| 2005/0271340 A1 | 12/2005 | Weisberg et al. |
| 2006/0024001 A1 | 2/2006 | Kobayashi |
| 2006/0054606 A1 | 3/2006 | Amako |
| 2006/0067632 A1 | 3/2006 | Broeng et al. |
| 2006/0219673 A1 | 10/2006 | Varnham et al. |
| 2006/0275705 A1 | 12/2006 | Dorogy et al. |
| 2006/0291788 A1 | 12/2006 | Po |
| 2007/0026676 A1 | 2/2007 | Li et al. |
| 2007/0041083 A1 | 2/2007 | Di Teodoro et al. |
| 2007/0047066 A1 | 3/2007 | Green |
| 2007/0047940 A1 | 3/2007 | Matsumoto |
| 2007/0075060 A1 | 4/2007 | Shedlov et al. |
| 2007/0104436 A1 | 5/2007 | Li et al. |
| 2007/0104438 A1 | 5/2007 | Varnham |
| 2007/0147751 A1 | 6/2007 | Fini |
| 2007/0178674 A1 | 8/2007 | Imai et al. |
| 2007/0195850 A1 | 8/2007 | Schluter et al. |
| 2007/0215820 A1 | 9/2007 | Cordingley et al. |
| 2007/0251543 A1 | 11/2007 | Singh |
| 2008/0037604 A1 | 2/2008 | Savage-Leuchs |
| 2008/0124022 A1 | 5/2008 | Ivtsenkov |
| 2008/0141724 A1 | 6/2008 | Fuflyigin |
| 2008/0154249 A1 | 6/2008 | Cao |
| 2008/0181567 A1 | 7/2008 | Bookbinder et al. |
| 2008/0231939 A1 | 9/2008 | Gluckstad |
| 2008/0246024 A1 | 10/2008 | Touwslager et al. |
| 2009/0034059 A1 | 2/2009 | Fini |
| 2009/0052849 A1 | 2/2009 | Lee et al. |
| 2009/0059353 A1 | 3/2009 | Fini |
| 2009/0080472 A1 | 3/2009 | Yao et al. |
| 2009/0080835 A1 | 3/2009 | Frith |
| 2009/0122377 A1 | 5/2009 | Wagner |
| 2009/0127477 A1 | 5/2009 | Tanaka et al. |
| 2009/0129237 A1 | 5/2009 | Chen et al. |
| 2009/0152247 A1 | 6/2009 | Jennings et al. |
| 2009/0154512 A1 | 6/2009 | Simons et al. |
| 2009/0175301 A1 | 7/2009 | Li et al. |
| 2009/0257621 A1 | 10/2009 | Silver |
| 2009/0274833 A1 | 11/2009 | Li |
| 2009/0297108 A1 | 12/2009 | Ushiwata et al. |
| 2009/0297140 A1 | 12/2009 | Heismann et al. |
| 2009/0314752 A1 | 12/2009 | Manens et al. |
| 2009/0324233 A1 | 12/2009 | Samartsev et al. |
| 2010/0025387 A1 | 2/2010 | Arai et al. |
| 2010/0067013 A1 | 3/2010 | Howieson et al. |
| 2010/0067555 A1 | 3/2010 | Austin et al. |
| 2010/0067860 A1 | 3/2010 | Ikeda et al. |
| 2010/0116794 A1 | 5/2010 | Taido et al. |
| 2010/0129029 A1 | 5/2010 | Westbrook |
| 2010/0150186 A1 | 6/2010 | Mizuuchi |
| 2010/0163537 A1 | 7/2010 | Furuta et al. |
| 2010/0187409 A1 | 7/2010 | Cristiani et al. |
| 2010/0225974 A1 | 9/2010 | Sandstrom |
| 2010/0230665 A1 | 9/2010 | Verschuren et al. |
| 2010/0251437 A1 | 9/2010 | Heyn et al. |
| 2010/0252543 A1 | 10/2010 | Manens et al. |
| 2010/0257641 A1 | 10/2010 | Perkins et al. |
| 2010/0303419 A1 | 12/2010 | Benjamin et al. |
| 2011/0032602 A1 | 2/2011 | Rothenberg |
| 2011/0058250 A1 | 3/2011 | Liu et al. |
| 2011/0080476 A1 | 4/2011 | Dinauer et al. |
| 2011/0091155 A1 | 4/2011 | Yilmaz et al. |
| 2011/0127697 A1 | 6/2011 | Milne |
| 2011/0133365 A1 | 6/2011 | Ushimaru et al. |

(56) References Cited

U.S. PATENT DOCUMENTS

| | | |
|---|---|---|
| 2011/0163077 A1 | 7/2011 | Partlo et al. |
| 2011/0187025 A1 | 8/2011 | Costin, Sr. |
| 2011/0243161 A1 | 10/2011 | Tucker et al. |
| 2011/0248005 A1 | 10/2011 | Briand et al. |
| 2011/0278277 A1 | 11/2011 | Stork Genannt Wersborg |
| 2011/0279826 A1 | 11/2011 | Miura et al. |
| 2011/0297229 A1 | 12/2011 | Gu et al. |
| 2011/0305249 A1 | 12/2011 | Gapontsev et al. |
| 2011/0305256 A1 | 12/2011 | Chann |
| 2011/0316029 A1 | 12/2011 | Maruyama et al. |
| 2012/0002919 A1 | 1/2012 | Liu |
| 2012/0009511 A1 | 1/2012 | Dimitriev |
| 2012/0051084 A1 | 3/2012 | Yalin et al. |
| 2012/0051692 A1 | 3/2012 | Seo |
| 2012/0082410 A1 | 4/2012 | Peng et al. |
| 2012/0093461 A1 | 4/2012 | Ramachandran |
| 2012/0127097 A1 | 5/2012 | Gaynor et al. |
| 2012/0127563 A1 | 5/2012 | Farmer et al. |
| 2012/0128294 A1 | 5/2012 | Voss et al. |
| 2012/0145685 A1 | 6/2012 | Ream et al. |
| 2012/0148823 A1 | 6/2012 | Chu |
| 2012/0156458 A1 | 6/2012 | Chu |
| 2012/0168411 A1 | 7/2012 | Farmer et al. |
| 2012/0219026 A1 | 8/2012 | Saracco et al. |
| 2012/0262781 A1 | 10/2012 | Price et al. |
| 2012/0267345 A1 | 10/2012 | Clark |
| 2012/0295071 A1 | 11/2012 | Sato |
| 2012/0301733 A1 | 11/2012 | Eckert et al. |
| 2012/0301737 A1 | 11/2012 | Labelle et al. |
| 2012/0321262 A1 | 12/2012 | Goell et al. |
| 2012/0329974 A1 | 12/2012 | Inada et al. |
| 2013/0005139 A1 | 1/2013 | Krasnov et al. |
| 2013/0022754 A1 | 1/2013 | Bennett et al. |
| 2013/0023086 A1 | 1/2013 | Chikama et al. |
| 2013/0027648 A1 | 1/2013 | Moriwaki |
| 2013/0028276 A1 | 1/2013 | Minelly et al. |
| 2013/0038923 A1 | 2/2013 | Jespersen et al. |
| 2013/0087694 A1 | 4/2013 | Creeden et al. |
| 2013/0095260 A1 | 4/2013 | Bovatsek et al. |
| 2013/0134637 A1 | 5/2013 | Wiesner et al. |
| 2013/0014925 A1 | 6/2013 | Muendel et al. |
| 2013/0146569 A1 | 6/2013 | Woods et al. |
| 2013/0148925 A1 | 6/2013 | Muendel et al. |
| 2013/0182725 A1 | 7/2013 | Karlsen et al. |
| 2013/0186871 A1 | 7/2013 | Suzuki |
| 2013/0202264 A1 | 8/2013 | Messerly |
| 2013/0223792 A1 | 8/2013 | Huber et al. |
| 2013/0228442 A1 | 9/2013 | Mohaptatra et al. |
| 2013/0251324 A1 | 9/2013 | Fini et al. |
| 2013/0272657 A1 | 10/2013 | Salokatve |
| 2013/0299468 A1 | 11/2013 | Unrath et al. |
| 2013/0301300 A1 | 11/2013 | Duerksen et al. |
| 2013/0308661 A1 | 11/2013 | Nishimura et al. |
| 2013/0343703 A1 | 12/2013 | Genier |
| 2014/0044143 A1 | 2/2014 | Clarkson et al. |
| 2014/0086526 A1 | 3/2014 | Starodubov et al. |
| 2014/0104618 A1 | 4/2014 | Potsaid et al. |
| 2014/0155873 A1 | 6/2014 | Bor |
| 2014/0177038 A1 | 6/2014 | Rrataj et al. |
| 2014/0178023 A1 | 6/2014 | Oh et al. |
| 2014/0205236 A1 | 7/2014 | Noguchi et al. |
| 2014/0233900 A1 | 8/2014 | Hugonnot et al. |
| 2014/0241385 A1 | 8/2014 | Fomin et al. |
| 2014/0259589 A1 | 9/2014 | Xu et al. |
| 2014/0263209 A1 | 9/2014 | Burris et al. |
| 2014/0268310 A1 | 9/2014 | Ye et al. |
| 2014/0271328 A1 | 9/2014 | Burris |
| 2014/0313513 A1 | 10/2014 | Liao |
| 2014/0319381 A1 | 10/2014 | Gross |
| 2014/0332254 A1 | 11/2014 | Pellerite et al. |
| 2014/0333931 A1 | 11/2014 | Lu et al. |
| 2014/0334788 A1 | 11/2014 | Fini et al. |
| 2015/0049987 A1 | 2/2015 | Grasso et al. |
| 2015/0096963 A1 | 4/2015 | Bruck |
| 2015/0104139 A1 | 4/2015 | Brunet et al. |
| 2015/0125114 A1 | 5/2015 | Genier |
| 2015/0125115 A1 | 5/2015 | Genier |
| 2015/0138630 A1 | 5/2015 | Honea et al. |
| 2015/0165556 A1 | 6/2015 | Jones et al. |
| 2015/0217402 A1 | 8/2015 | Hesse et al. |
| 2015/0241632 A1 | 8/2015 | Chann et al. |
| 2015/0270089 A1 | 9/2015 | Ghanea-Hercock |
| 2015/0283613 A1 | 10/2015 | Backlund et al. |
| 2015/0293300 A1 | 10/2015 | Fini et al. |
| 2015/0293306 A1 | 10/2015 | Huber et al. |
| 2015/0314612 A1 | 11/2015 | Balasini et al. |
| 2015/0316716 A1 | 11/2015 | Fini et al. |
| 2015/0325977 A1 | 11/2015 | Gu |
| 2015/0331205 A1 | 11/2015 | Tayebati et al. |
| 2015/0349481 A1 | 12/2015 | Kliner |
| 2015/0352664 A1 | 12/2015 | Errico et al. |
| 2015/0372445 A1 | 12/2015 | Harter |
| 2015/0378184 A1 | 12/2015 | Tayebati et al. |
| 2016/0013607 A1 | 1/2016 | McComb et al. |
| 2016/0052162 A1 | 2/2016 | Colin |
| 2016/0059354 A1 | 3/2016 | Sercel |
| 2016/0097903 A1 | 4/2016 | Li et al. |
| 2016/0104995 A1 | 4/2016 | Savage-Leuchs |
| 2016/0114431 A1 | 4/2016 | Cheverton et al. |
| 2016/0116679 A1 | 4/2016 | Muendel et al. |
| 2016/0158889 A1 | 6/2016 | Carter et al. |
| 2016/0187646 A1 | 6/2016 | Ehrmann |
| 2016/0207111 A1 | 7/2016 | Robrecht et al. |
| 2016/0218476 A1 | 7/2016 | Kliner et al. |
| 2016/0285227 A1 | 9/2016 | Farrow et al. |
| 2016/0294150 A1 | 10/2016 | Johnson |
| 2016/0320565 A1 | 11/2016 | Brown et al. |
| 2016/0320685 A1 | 11/2016 | Tayebati et al. |
| 2016/0369332 A1 | 12/2016 | Rothberg |
| 2017/0003461 A1 | 1/2017 | Tayebati et al. |
| 2017/0090119 A1 | 3/2017 | Logan et al. |
| 2017/0110845 A1 | 4/2017 | Hou et al. |
| 2017/0120537 A1 | 5/2017 | DeMuth et al. |
| 2017/0162999 A1 | 6/2017 | Saracco et al. |
| 2017/0271837 A1 | 9/2017 | Hemenway et al. |
| 2017/0293084 A1 | 10/2017 | Zhou et al. |
| 2017/0336580 A1 | 11/2017 | Tayebati et al. |
| 2017/0363810 A1 | 12/2017 | Holland et al. |
| 2018/0059343 A1 | 3/2018 | Kliner |
| 2018/0088357 A1 | 3/2018 | Kliner et al. |
| 2018/0088358 A1 | 3/2018 | Kliner et al. |
| 2018/0203185 A1 | 7/2018 | Farrow et al. |
| 2019/0025809 A1 | 8/2019 | Kliner |
| 2019/0250398 A1 | 8/2019 | Small |

FOREIGN PATENT DOCUMENTS

| | | |
|---|---|---|
| CN | 1212056 | 3/1999 |
| CN | 1584644 | 2/2005 |
| CN | 1617003 | 5/2005 |
| CN | 1217030 C | 8/2005 |
| CN | 1926460 | 8/2005 |
| CN | 1966224 | 5/2007 |
| CN | 1327254 | 7/2007 |
| CN | 101143405 | 3/2008 |
| CN | 101303269 | 11/2008 |
| CN | 101314196 | 12/2008 |
| CN | 101435918 | 5/2009 |
| CN | 101733561 | 6/2010 |
| CN | 101836309 | 9/2010 |
| CN | 102007653 | 4/2011 |
| CN | 201783759 | 4/2011 |
| CN | 102176104 | 9/2011 |
| CN | 102441740 | 5/2012 |
| CN | 102448623 | 5/2012 |
| CN | 102481664 | 5/2012 |
| CN | 101907742 B | 7/2012 |
| CN | 102549377 | 7/2012 |
| CN | 102782540 | 11/2012 |
| CN | 102844942 | 12/2012 |
| CN | 103056513 | 4/2013 |
| CN | 103097931 | 5/2013 |
| CN | 103173760 | 6/2013 |
| CN | 103490273 | 1/2014 |

(56) References Cited

FOREIGN PATENT DOCUMENTS

| | | |
|---|---|---|
| CN | 103521920 | 1/2014 |
| CN | 103606803 | 2/2014 |
| CN | 103999302 | 8/2014 |
| CN | 104136952 | 11/2014 |
| CN | 104169763 | 11/2014 |
| CN | 104999670 | 10/2015 |
| CN | 105383060 | 3/2016 |
| CN | 102582274 | 7/2019 |
| DE | 3833992 | 4/1990 |
| DE | 4200587 | 4/1993 |
| DE | 4437284 | 4/1996 |
| DE | 203 20 269 | 4/2004 |
| DE | 10321102 | 12/2004 |
| DE | 60312826 | 1/2008 |
| DE | 102009026526 | 12/2010 |
| DE | 102013205029 | 9/2014 |
| DE | 102013215362 | 9/2014 |
| DE | 102013017792 | 4/2015 |
| DE | 202016004237 | 8/2016 |
| DE | 102015103127 | 9/2016 |
| EP | 0366856 | 5/1990 |
| EP | 1238745 | 9/2002 |
| EP | 1681542 | 7/2006 |
| EP | 1800700 | 6/2007 |
| EP | 374848 | 10/2008 |
| EP | 1266259 | 5/2011 |
| EP | 2587564 | 5/2013 |
| EP | 2642246 | 9/2013 |
| EP | 2886226 | 6/2015 |
| JP | H02220314 | 9/1990 |
| JP | H06-297168 | 10/1994 |
| JP | H11780 | 1/1999 |
| JP | H11-287922 | 10/1999 |
| JP | H11-344636 | 12/1999 |
| JP | 2003-129862 | 5/2003 |
| JP | 200320286 | 7/2003 |
| JP | 2003200286 | 7/2003 |
| JP | 2004291031 | 10/2004 |
| JP | 2005/070608 | 3/2005 |
| JP | 2006-45584 | 2/2006 |
| JP | 2006-098085 | 4/2006 |
| JP | 2006-106227 | 4/2006 |
| JP | 2008-281395 | 11/2008 |
| JP | 2009-142866 | 7/2009 |
| JP | 2009-248157 | 10/2009 |
| JP | 2012-059920 | 3/2012 |
| JP | 2012-528011 | 11/2012 |
| JP | 2016/201558 | 12/2016 |
| KR | 10-2011-0109957 | 10/2011 |
| RU | 2008742 | 2/1994 |
| RU | 68715 | 11/2007 |
| RU | 2365476 | 8/2009 |
| RU | 2528287 | 9/2014 |
| RU | 2015112812 | 10/2016 |
| TW | 200633062 | 9/2006 |
| TW | 200707466 | 2/2007 |
| TW | 201307949 | 2/2013 |
| WO | 1995/011100 | 4/1995 |
| WO | 1995/011101 | 4/1995 |
| WO | 2003/044914 | 5/2003 |
| WO | 2004/027477 | 4/2004 |
| WO | WO 2004/027477 | 4/2004 |
| WO | WO 2008/053915 | 5/2008 |
| WO | 2009/155536 | 12/2009 |
| WO | 2010/029243 | 3/2010 |
| WO | 2011/124671 | 10/2011 |
| WO | WO 2011/124671 | 10/2011 |
| WO | 2011/046407 | 11/2011 |
| WO | 2012/165389 | 5/2012 |
| WO | 2012/102655 | 8/2012 |
| WO | 2013/090236 | 6/2013 |
| WO | WO 2013/090236 | 6/2013 |
| WO | 2014/074947 | 5/2014 |
| WO | WO 2014/154901 | 10/2014 |
| WO | 2014/179345 | 11/2014 |
| WO | 2014/180870 | 11/2014 |
| WO | 2015/156281 | 10/2015 |
| WO | 2015/189883 | 12/2015 |
| WO | 2016/061657 | 4/2016 |
| WO | 2017/008022 | 1/2017 |
| WO | WO 2017/008022 | 1/2017 |
| WO | 2017/136831 | 8/2017 |

OTHER PUBLICATIONS

"Canunda, Application Note: Flexible high-power laser beam shaping," CAILabs, available at: www.cailabs.com, 22 pages, date unknown (in a related U.S. Appl. No. 15/607,399).

First Office Action for related Chinese Application No. 201610051671.X, dated Jun. 4, 2018, 25 pages (w/ English translation).

Fuse, "Beam Shaping for Advanced Laser Materials Processing," Laser Technik Journal, pp. 19-22 (Feb. 2015).

Garcia et al., "Fast adaptive laser shaping based on multiple laser incoherent combining," Proc. of SPIE, 10097:1009705-1-1009705-15 (Feb. 22, 2017).

Huang et al., "All-fiber mode-group-selective photonic lantern using graded-index multimode fibers," Optics Express, 23:224-234 (Jan. 6, 2015).

International Search Report and Written Opinion from International Application No. PCT/US2018/024908, dated Jul. 19, 2018, 8 pages.

Jain et al., "Multi-element fiber technology for space-division multiplexing applications," Optics Express, 22:3787-3796 (Feb. 11, 2014).

Jin et al., "Mode Coupling Effects in Ring-Core Fibers for Space-Division Multiplexing Systems," Journal of Lightwave Technology, 34:3365-3372 (Jul. 15, 2016).

Newkirk et al., "Bending sensor combining multicore fiber with a mide-selective photonic lantern," Optics Letters, 40:5188-5191 (Nov. 15, 2015).

Office action from U.S. Appl. No. 15/607,411, dated Jun. 12, 2018, 19 pages.

SeGall et al., "Simultaneous laser mode conversion and beam combining using multiplexed volume phase elements," Advanced Solid-State Lasers Congress Technical Digest, Optical Society of America, paper AW2A.9, 3 pages (Oct. 27-Nov. 1, 2013).

Argyros et al., "Bend loss in highly multimode fibres," Optics Express, 16:18590-18598 (Nov. 10, 2008).

Andreasch et al., "Two concentric fiber diameters in one laser light cable," Optical Components, No. 1, pp. 38-41 (Jan. 2011).

Bai et al., "Effect of Bimodal Powder Mixture on Powder Packing Density and Sintered Density in Binder Jetting of Metals," 26th Annual International Solid Freeform Fabrication Symposium, 14 pages (Aug. 10-12, 2015).

Balazic, "Additive Manufacturing and 3D Printing LENS Technology," Additive Manufacturing of Metal Components Conference at IK4-Lortek, 52 pages (Nov. 27, 2013).

"Bending Machine," CBC Alta Technologia Italiana, General Catalog, pp. 96-97 (2011).

Brown et al., "Fundamentals of Laser-Material Interaction and Application to Multiscale Surface Modification," Chapter 4, Laser Precision Microfabrication, pp. 91-120 (2010).

Duflou et al., "Development of a Real Time Monitoring and Adaptive Control System for Laser Flame Cutting," ICALEO 2009, 527, 10 pages published online Sep. 27, 2018.

"Enhanced LENS Thermal Imaging Capabilities Introduced by Optomec," OPTOMEC, 4 pages (Jan. 8, 2013).

Extended European Search Report for related Application No. 18173438.5, 11 pages, dated Oct. 15, 2018.

Extended European Search Report for related Application No. 16849882.2, 8 pages, dated Apr. 23, 2019.

Fini, "Bend distortion in large-mode-area amplifier fiber design," Proc. of SPIE, 6781:67810E-1-67810E-11 (Nov. 21, 2007).

Heider et al., "Process Stabilization at welding Copper by Laser Power Modulation," Physics Procedia, 12:81-87 (2011).

International Preliminary Report on Patentability from International Application No. PCT/US2017/034848, dated Apr. 2, 2019, 9 pages.

Ivanov et al., "Fiber-Optic Bend Sensor Based on Double Cladding Fiber," Journal of Sensors, 2015, 6 pages (2015).

(56) References Cited

OTHER PUBLICATIONS

Ivanov et al., "Fiber structure based on a depressed inner cladding fiber for bend, refractive index and temperature sensing," Meas. Sci. Technol., 25:1-8 (2014).
Jacobs, "Suggested Guidelines for the Handling of Optical Fiber," White Paper, Corning Incorporated, pp. 1-8 (Dec. 2001).
Jollivet, "Specialty Fiber Lasers and Novel Fiber Devices," Doctoral Dissertation, University of Central Florida, 213 pages (2014).
Jollivet et al., "Advances in Multi-Core Fiber Lasers," Latin America Optics and Photonics Conference, OSA Technical, 4 pages (Nov. 2014).
Khairallah et al, "Laser power-bed fusion additive manufacturing: Effects of main physical processes on dynamical melt flow and pore formation from mesoscopic powder simulation," Lawrence Livermore National Laboratory, 26 pages (Aug. 20, 2015).
Martins et al., "Modeling of Bend Losses in Single-Mode Optical Fibers," 7th Conference on Telecommunications, 4 pages (Jan. 2009).
Messerly et al., "Field-flattened, ring-like propagation modes," Optics Express, 21:12683-12698 (May 16, 2013).
Messerly et al., "Patterned flattened modes," Optics Letters, 38:3329-3332 (Sep. 1, 2013).
Neilson et al., "Free-space optical relay for the interconnection of multimode fibers," Applied Optics, 38:2291-2296 (Apr. 10, 1999).
Neilson et al., "Plastic modules for free-space optical interconnects," Applied Optics, 37:2944-2952 (May 10, 1998).
Saint-Pierre et al., "Fast uniform micro structuring of DLC surfaces using multiple ultrashort laser spots through spatial beam shaping," Physics Procedia, 83:1178-1183 (2016).
Salceda-Delgado et al., "Compact fiber-optic curvature sensor based on super-mode interference in a seven-core fiber," Optics Letters, 40:1468-1471 (Apr. 1, 2015).
Sateesh et al., "Effect of Process Parameters on Surface Roughness of Laser Processed Inconel Superalloy," International Journal of Scientific & Engineering Research, 5:232-236 (Aug. 2014).
Shusteff et al., "One-step volumetric additive manufacturing of complex polymer structures," Sci. Adv., 3:1-7 (Dec. 8, 2017).
Rosales-Guzman et al., "Multiplexing 200 modes on a single digital hologram," available at: http://arxiv.org/pdf/1706.06129v1, pp. 1-14 (Jun. 19, 2017).
"UNI 42 A," Curvatubi elettrica digitale, 5 pages (2016).
"UNI 60 COMBI 2," Frame-Grab of YouTube Video, 1 page (Sep. 26, 2011).
Villatoro et al., "Ultrasensitive vector bending sensor based on multicore optical fiber," Optics Letters, 41:832-835 (Feb. 15, 2016).
Wang et al., "Mechanisms and characteristics of spatter generation in SLM processing and its effect on the properties," Materials & Design, 117(5):121-130 (Mar. 5, 2017).
Zhang et al., "Switchable multiwavelength fiber laser by using a compact in-fiber Mach-Zehnder interferometer," J. Opt., 14:1-5 (2012).
Zlodeev et al., "Transmission spectra of a double-clad fibre structure under bending," Quantum Electronics, 48:535-541 (2013).
Goppold, et al., "Dynamic Beam Shaping Improves Laser Cutting of Thick Steel Plates," Industrial Photonics vol. 4, Issue 3, Jul. 2017, pp. 18-19.
Business Unit Laser Ablation and Cutting "Laser Beam Fusion Cutting with Dynamic Beam Shaping," Fraunhofer IWS Annual Report 2015, 2 pages.
Herwig, et al. "Possibilities of Power Modulation and Dynamic Beam Shaping", Fraunhofer IWS presentation, retrieved on Mar. 16, 2018, 6 pages.
Nazemosadat E. et al.; Saturable Absorption in Multicore Fiber Couplers; Dept of EE and Computer Science, University of Wisconsin-Milwaukee; Opt. Soc, AmB, N. 11, Nov. 2013.
Dorrington et al.; "A Simple Microcontroller Based Digital Lock-In Amplifier for the Detection of Low Level Optical Signals": Proceedings of the First IEEE International Workshop on Electronic Design, Test and Applications; (Delta 01) Year 2002.
International Search Report and Written Opinion for International Application No. PCT/US2018/024959, dated Jun. 28, 2018, 7 pages.
International Search Report and Written Opinion for International Application No. PCT/US2018/024976, dated Aug. 9, 2018, 8 pages.
International Search Report and Written Opinion for International Application No. PCT/US2018/024889, dated Jul. 28, 2018, 5 pages.
International Search Report and Written Opinion for International Application No. PCT/US2018/024641, dated Jul. 12, 2018, 6 pages.
International Search Report and Written Opinion for International Application No. PCT/US2018/023012, dated Jul. 23, 2018, 6 pages.
International Search Report and Written Opinion for International Application No. PCT/US2018/023009, dated Jul. 18, 2018, 8 pages.
International Search Report and Written Opinion for International Application No. PCT/US2018/016305, dated Jun. 11, 2018, 10 pages.
International Search Report and Written Opinion for International Application No. PCT/US2018/016288, dated Jun. 11, 2018, 10 pages.
Alcock et al., Element Table, *Canadian Metallurgical Quarterly*, 23:309-311 (1984).
Affine Transformation—from Wolfram MathWorld, http://mathworld.wolfram.com/AffineTransformation.html, downloaded Feb. 21, 2014, 2 pages.
AlMangour et al., "Scanning strategies for texture and anisotropy tailoring during selective laser melting of TiC/316L stainless steel nanocomposites," *Journal of Alloys and Compounds*, 728:424-435 (Aug. 5, 2017).
Anastasiadi et al., "Fabrication and characterization of machined multi-core fiber tweezers for single cell manipulation," *Optics Express*, 26:3557-3567 (Feb. 5, 2018).
Ayoola, "Study of Fundamental Laser Material Interaction Parameters in Solid and Powder Melting," Ph.D. Thesis, Cranfield University, 192 pages (May 2016).
Barron et al., "Dual-beam interference from a lensed multicore fiber and its application to optical trapping," *Optics Express*, 20:23156-23161 (Oct. 8, 2012).
Barron et al., "Optical Trapping using a Lensed Multicore Fiber," Workshop on Specialty Optical Fibers and their Applications, OSA 2013, 2 pages (2013).
Bergmann et al., "Effects of diode laser superposition on pulsed laser welding of aluminum," *Physics Procedia*, 41:180-189 (2013).
Bertoli et al., "On the limitations of Volumetric Energy Density as a design parameter for Selective Laser Melting," *Materials and Design*, 113:331-340 (Oct. 19, 2016).
Birks et al., "The photonic lantern," *Advances in Optics and Photonics*, 7:107-167 (2015).
Burger et al., "Implementation of a spatial light modulator for intracavity beam shaping," *J. Opt.*, 17:1-7, (2015).
"Canunda, Application Note," CAILabs, available at: www.cailabs.com, 16 pages (Jun. 10, 2015).
"Canunda, Application Note: Flexible high-power laser beam shaping," CAILabs, available at: www.cailabs.com, 22 pages, date unknown (in a related U.S. Appl. No. 15/607,399).
Caprio, "Investigation of emission modes in the SLM of AISI 316L: modelling and process diagnosis," Ph.D. Thesis, Polytechnic University of Milan, 3 pages (Apr. 28, 2017).—Abstract only.
Chen et al., "An Algorithm for correction of Distortion of Laser marking Systems," IEEE International Conference on Control and Automation, Guangzhou, China, 5 pages (May 30-Jun. 1, 2007).
Chen et al., "Improving additive manufacturing processability of hard-to-process overhanging structure by selective laser melting," *Journal of Materials Processing Tech.*, 250:99-108 (Jul. 1, 2017).
Chung, "Solution-Processed Flexible Transparent Conductors Composed of Silver Nanowire Networks Embedded in Indium Tin Oxide Nanoparticle Matrices," Nano Research, 10 pages (Sep. 24, 2012).
Cloots et al., "Investigations on the microstructure and crack formation of IN738LC samples processed by selective laser melting using Gaussian and doughnut profiles," *Materials and Design*, 89:770-784 (2016).
Cui, et al., "Calibration of a laser galvanometric scanning system by adapting a camera model," Applied Optics 48(14):2632-2637 (Jun. 2009).

(56) References Cited

OTHER PUBLICATIONS

DebRoy et al., "Additive manufacturing of metallic components—Process, structure and properties," *Progress in Materials Science*, 92:112-224 (2018).
Decombe et al., "Single and dual fiber nano-tip optical tweezers: trapping and analysis," Optics Express, 21:30521-30531 (Dec. 4, 2013).
Dehoff et al., "Site specific control of crystallographic grain orientation through electron beam additive manufacturing," *Materials Science and Technology*, 31:931-938 (2015).
Demir et al., "From pulsed to continuous wave emission in SLM with contemporary fiber laser sources: effect of temporal and spatial pulse overlap in part quality," *Int. J. Adv. Manuf. Technol.*, 91:2701-2714 (Jan. 10, 2017).
Deng et al., "Annular arrayed-waveguide fiber for autofocusing Airy-like beams," *Optics Letters*, 41:824-827 (Feb. 15, 2016).
Dezfoli et al., "Determination and controlling of grain structure of metals after laser incidence: Theoretical approach," *Scientific Reports*, 7:1-11 (Jan. 30, 2017).
Drobczynski et al., "Real-time force measurement in double wavelength optical tweezers," *Journal of the Optical Society of America B*, 34:38-43 (Jan. 2017).
Duocastella et al., "Bessel and annular beams for materials processing," *Laser Photonics Rev.* 6, pp. 607-621 (2012).
Faidel et al., "Improvement of selective laser melting by beam shaping and minimized thermally induced effects in optical systems," 9th International Conference on Photonic Technologies LANE 2016, pp. 1-4 (2016).
Farley et al., "Optical fiber designs for beam shaping," *Proc. of SPIE, Fiber Lasers XI: Technology, Systems, and Applications*, 8961:89612U-1-89612U-10 (2014).
Fey, "3D Printing and International Security," PRIF Report No. 144, 47 pages (2017).
Francis, "The Effects of Laser and Electron Beam Spot Size in Additive Manufacturing Processes," Ph.D. Thesis, Carnegie Mellon University, 191 pages (May 2017).
Fuchs et al., "Beam shaping concepts with aspheric surfaces," *Proc. of SPIE*, 9581:95810L-1-95810L-7 (Aug. 25, 2015).
Gardner, "Precision Photolithography on Flexible Substrates," http://azorescorp.com/downloads/Articles/AZORESFlexSubstrate.pdf (prior to Jan. 30, 2013).
Ghouse et al., "The influence of laser parameters and scanning strategies on the mechanical properties of a stochastic porous material," *Materials and Design*, 131:498-508 (2017).
Giannini et al., "Anticipating, measuring, and minimizing MEMS mirror scan error to improve laser scanning microscopy's speed and accuracy," PLOS ONE, 14 pages (Oct. 3, 2017).
Gissibl et al., "Sub-micrometre accurate free-form optics by three-dimensional printing on single-mode fibres," *Nature Communications*, 7:1-9 (Jun. 24, 2016).
Gockel et al., "Integrated melt pool and microstructure control for Ti-6Al-4V thin wall additive manufacturing," *Materials Science and Technology*, 31:912-916 (Nov. 3, 2014).
Grigoriyants et al., "Tekhnologicheskie protsessy lazernoy obrabotki," Moscow, izdatelstvo MGTU im. N.E. Baumana, p. 334 (2006).
Gris-Sanchez et al., "The Airy fiber: an optical fiber that guides light diffracted by a circular aperture," *Optica*, 3:270-276 (Mar. 2016).
Gunenthiram et al., "Analysis of laser-melt pool-powder bed interaction during the selective laser melting of a stainless steel," *Journal of Laser Applications*, 29:022303-1-022303-8 (May 2017).
Gupta, "A Review on Layer Formation Studies in Selective Laser Melting of Steel Powders and Thin Wall Parts Using Pulse Shaping," *International Journal of Manufacturing and Material Processing*, 3:9-15 (2017).
Hafner et al., "Tailored laser beam shaping for efficient and accurate microstructuring," *Applied Physics A*, 124:111-1-111-9 (Jan. 10, 2018).

Han et al., "Selective laser melting of advanced Al-$Al_2O_3$ nanocomposites: Simulation, microstructure and mechanical properties," *Materials Science & Engineering A*, 698:162-173, (May 17, 2017).
Hansen et al., "Beam shaping to control of weldpool size in width and depth," *Physics Procedia*, 56:467-476 (2014).
Hauschild, "Application Specific Beam Profiles—New Surface and Thin-Film Refinement Processes using Beam Shaping Technologies," *Proc. of SPIE*, 10085:100850J-1-100850J-9 (Feb. 22, 2017).
Hebert, "Viewpoint: metallurgical aspects of powder bed metal additive manufacturing," *J. Mater. Sci.*, 51:1165-1175 (Nov. 18, 2015).
Heck, "Highly integrated optical phased arrays: photonic integrated circuits for optical beam shaping and beam steering," *Nanophotonics*, 6:93-107 (2017).
Huang et al., "3D printing optical engine for controlling material microstructure," *Physics Procedia*, 83:847-853 (2016).
Java—Transform a triangle to another triangle—Stack Overflow, http://stackoverflow.com/questions/1114257/transform-a-triangle-to-another-triangle?lq=1, downloaded Feb. 21, 2014, 3 pages.
Ji et al., "Meta-q-plate for complex beam shaping," *Scientific Reports*, 6:1-7 (May 6, 2016).
Kaden et al., "Selective laser melting of copper using ultrashort laser pulses," Lasers in Manufacturing Conference 2017, pp. 1-5 (2017).
Kaden et al., "Selective laser melting of copper using ultrashort laser pulses," *Applied Physics A*, 123:596-1-596-6 (Aug. 24, 2017).
Keicher et al., "Advanced 3D Printing of Metals and Electronics using Computational Fluid Dynamics," Solid Freeform Fabrication Symposium, 32 pages (Aug. 2015).
Khijwania et al., "Propagation characteristics of single-mode graded-index elliptical core linear and nonlinear fiber using super-Gaussian approximation," *Applied Optics*, 48:G156-G162 (Nov. 1, 2009).
King et al., "Observation of keyhole-mode laser melting in laser powder-bed fusion additive manufacturing," *Journal of Materials Processing Technology*, 214:2915-2925 (2014).
Klerks et al., "Flexible beam shaping system for the next generation of process development in laser micromachining," 9th International Conference on Photonic Technologies LANE 2016, pp. 1-8 (2016).
Kosolapov et al., "Hollow-core revolver fibre with a double-capillary reflective cladding," *Quantum Electronics*, 46:267-270 (2016).
Krupa et al., "Spatial beam self-cleaning in multimode fiber," available at: https://arxiv.org/abs/1603.0272v1, 8 pages (Mar. 9, 2016).
Kruth et al., "On-line monitoring and process control in selective laser melting and laser cutting," *Proceedings of the 5th Lane Conference, laser Assisted Net Shape Engineering*, vol. 1, 14 pages, (Sep. 1, 2007).
Kummer et al., "Method to quantify accuracy of position feedback signals of a three-dimensional two-photon laser-scanning microscope," *Biomedical Optics Express*, 6(10):3678-3693 (Sep. 1, 2015).
Laskin et al., "Applying of refractive spatial beam shapers with scanning optics," ICALEO, Paper M604, pp. 941-947 (2011).
Laskin et al., "Beam shaping to generate uniform "Laser Light Sheet" and Linear Laser Spots," *Proc. of SPIE, The International Society for Optical Engineering*, 13 pages (Sep. 2013).
Lee et al., "FEM Simulations to Study the Effects of Laser Power and Scan Speed on Molten Pool Size in Additive Manufacturing," *International Journal of Mechanical and Mechatronics Engineering*, 11:1291-1295 (2017).
Lee et al., "Use of the Coaxial-Core Profile in the Erbium-Doped Fiber Amplifier for Self-Regulation of Gain Spectrum," *IEICE Trans. Commun.*, E82-B:1273-1282 (Aug. 1999).
Li et al., "High-quality near-field beam achieved in a high-power laser based on SLM adaptive beam-shaping system," *Optics Express*, 23:681-689 (Jan. 12, 2015).
Li et al., "Melt-pool motion, temperature variation and dendritic morphology of Inconel 718 during pulsed-and continuous-wave laser additive manufacturing: A comparative study," *Materials and Design*, 119:351-360 (Jan. 23, 2017).
Litvin et al., "Beam shaping laser with controllable gain," *Appl. Phys. B*, 123:174-1-174-5 (May 24, 2017).

(56) References Cited

OTHER PUBLICATIONS

Liu et al., "Femtosecond laser additive manufacturing of YSZ," *Appl. Phys. A*, 123:293-1-293-8 (Apr. 1, 2017).

Ludtke, et al., "Calibration of Galvanometric Laser Scanners Using Statistical Learning Methods," Bildverabeitung fur die Medizin, pp. 467-472 (Feb. 25, 2015).

Malinauskas et al., "Ultrafast laser processing of materials: from science to industry," *Official Journal of the CIOMP, Light: Science & Applications*, 5:1-14 (2016).

Manakov, et al., "A Mathematical Model and Calibration Procedure for Galvanometric Laser Scanning Systems," Vision, Modeling, and Visualization, 8 pages (Jan. 2011).

Masoomi et al., "Quality part production via multi-laser additive manufacturing," *Manufacturing Letters*, 13:15-20 (May 27, 2017).

Matthews et al., "Diode-based additive manufacturing of metals using an optically-addressable light valve," *Optics Express*, 25:11788-11800 (May 15, 2017).

Meier et al., "Thermophysical Phenomena in Metal Additive Manufacturing by Selective Laser Melting: Fundamentals, Modeling, Simulation and Experimentation," available at: http://arxiv.org/pdf/1709.09510v1, pp. 1-59 (Sep. 4, 2017).

Morales-Delgado et al., "Three-dimensional microfabrication through a multimode optical fiber," available at: http://arxiv.org, 20 pages (2016).

Morales-Delgado et al., "Three-dimensional microfabrication through a multimode optical fiber," *Optics Express*, 25:7031-7045 (Mar. 20, 2017).

Mumtaz et al., "Selective Laser Melting of thin wall parts using pulse shaping," *Journal of Materials Processing Technology*, 210:279-287 (2010).

Naidoo et al., "Improving the laser brightness of a commercial laser system," *Proc. of SPIE*, 10036:100360V-1-100360V-8 (Feb. 3, 2017).

Ngcobo et al., "A digital laser for on-demand laser modes," *Nature Communications*, 4:1-6 (Aug. 2, 2013).

Ngcobo et al., "The digital laser," available at: http://arxiv.org, pp. 1-9 (2013).

Okunkova et al., "Experimental approbation of selective laser melting of powders by the use of non-Gaussian power density distributions," *Physics Procedia*, 56:48-57 (2014). (2017).

Okunkova et al., "Study of laser beam modulation influence on structure of materials produced by additive manufacturing," *Adv. Mater. Lett.*, 7:111-115 (2016).

Olsen, "Laser metal cutting with tailored beam patterns," available at: https://www.industrial-lasers.com/articles/print/volume-26/issue-5/features/laser-metal-cutting-with-tailored-beam-patterns.html, 8 pages (Sep. 1, 2011).

"Optical Tweezers & Micromanipulation: Applications Hamamatsu Photonics," available at: http://www.hamamatsu.com/jp/en/community/lcos/aplications/optical.html, archived: Mar. 27, 2015, 3 pages.

PCI-6110, Multifunction I/O Device, httpl/www.ni.com/en-us-support/model.pci-6110.html, downloaded Dec. 15, 2017, 1 page.

Pinkerton, "Lasers in Additive Manufacturing," *Optics & Laser Technology*, 78:25-32 (2016).

Prashanth et al., "Is the energy density a reliable parameter for materials synthesis by selective laser melting?" *Mater. Res. Lett.*, 5:386-390 (2017).

Product Brochure entitled "3-Axis and High Power Scanning" by Cambridge Technology, 4 pages, downloaded Dec. 21, 2013.

Product Brochure supplement entitled "Theory of Operation" by Cambridge Technology, 2 pages, downloaded Dec. 21, 2013.

Purtonen, et al., "Monitoring and Adaptive Control of Laser Processes," *Physics Procedia, Elsevier, Amsterdam, NL*, 56(9):1218-1231 (Sep. 9, 2014).

Putsch et al., "Active optical system for advanced 3D surface structuring by laser remelting," *Proc. of SPIE*, 9356:93560U-1-93560U-10 (Mar. 9, 2015).

Putsch et al., "Active optical system for laser structuring of 3D surfaces by remelting," *Proc. of SPIE*, 8843:88430D-1-88430D-8 (Sep. 28, 2013).

Putsch et al., "Integrated optical design for highly dynamic laser beam shaping with membrane deformable mirrors," *Proc. of SPIE*, 10090:1009010-1-1009010-8 (Feb. 20, 2017).

Raghavan et al., "Localized melt-scan strategy for site specific control of grain size and primary dendrite arm spacing in electron beam additive manufacturing," *Acta Materialia*, 140:375-387 (Aug. 30, 2017).

Rashid et al., "Effect of scan strategy on density and metallurgical properties of 17-4PH parts printed by Selective Laser Melting (SLM)," *Journal of Materials Processing Tech.*, 249:502-511 (Jun. 19, 2017).

Ren et al., "Resonant coupling in trenched bend-insensitive optical fiber," *Optics Letters*, 38:781-783 (Mar. 1, 2013).

Sateesh et al.; Effect of Process Parameters on Surface Rougness of Laser Processed Inconel Superalloy, International Journal of Scientifice and Engineering Research, vol. 5, Issue 8, Aug. 2014.

Sames et al., "The metallurgy and processing science of metal additive manufacturing," *International Materials Reviews*, pp. 1-46 (2016).

Schulze et al., "Mode Coupling in Few-Mode Fibers Induced by Mechanical Stress," *Journal of Lightwave Technology*, 33:4488-4496 (Nov. 1, 2015).

Skutnik et al., "Optical Fibers for Improved Low Loss Coupling of Optical Components," *Proc. of SPIE, Photon Processing in Microelectronics and Photnics III*, 6 pages (Jul. 15, 2004).

Smith et al., "Tailoring the thermal conductivity of the powder bed in Electron Beam Melting (EBM) Additive Manufacturing," *Scientific Reports*, 7:1-8 (Sep. 5, 2017).

Spears et al., "In-process sensing in selective laser melting (SLM) additive manufacturing," *Integrating Materials and Manufacturing Innovation*, 5:2-25 (2016).

Sundqvist et al., "Analytical heat conduction modelling for shaped laser beams," *Journal of Materials Processing Tech.*, 247:48-54 (Apr. 18, 2017).

Supplementary European Search Report for Application No. EP 17741945.4, 18 pages, dated Nov. 16, 2018.

Thiel et al., "Reliable Beam Positioning for Metal-based Additive Manufacturing by Means of Focal Shift Reduction," Lasers in Manufacturing Conference 2015, 8 pages (2015).

Tofail et al., "Additive manufacturing: scientific and technological challenges, market uptake and opportunities," *Materials Today*, pp. 1-16 (2017).

Trapp et al., "In situ absorptivity measurements of metallic powders during laser powder-bed fusion additive manufacturing," *Applied Materials Today*, 9:341-349 (2017).

Ulmanen, "The Effect of High Power Adjustable Ring Mode Fiber Laser for Material Cutting," M.S. Thesis, Tampere University of Technology, 114 pages (May 2017).

Van Newkirk et al., "Bending sensor combining multicore fiber with a mode-selective photonic lantern," *Optics Letters*, 40:5188-5191 (Nov. 15, 2015).

Valdez et al., "Induced porosity in Super Alloy 718 through the laser additive manufacturing process: Microstructure and mechanical properties," *Journal of Alloys and Compounds*, 725:757-764 (Jul. 22, 2017).

Wang et al., "Selective laser melting of W-Ni-Cu composite powder: Densification, microstructure evolution and nano-crystalline formation," *International Journal of Refractory Metals & Hard Materials*, 70:9-18 (Sep. 9, 2017).

Wilson-Heid et al., "Quantitative relationship between anisotropic strain to failure and grain morphology in additively manufactured Ti-6Al-4V," *Materials Science & Engineering A*, 706:287-294 (Sep. 6, 2017).

Wischeropp et al., "Simulation of the effect of different laser beam intensity profiles on heat distribution in selective laser melting," Laser in Manufacturing Conference 2015, 10 pages (2015).

Xiao et al., "Effects of laser modes on Nb segregation and Laves phase formation during laser additive manufacturing of nickel-based superalloy," *Materials Letters*, 188:260-262 (Nov. 1, 2016).

Xie et al., "Correction of the image distortion for laser galvanometric scanning system," *Optics & Laser Technology*, 37:305-311 (Jun. 2005).

(56) References Cited

OTHER PUBLICATIONS

Xu et al, "The Influence of Exposure Time on Energy Consumption and Mechanical Properties of SLM-fabricated Parts," 2017 Annual International Solid Freeform Fabrication Symposium, 7 pages (2017) Abstract only.
Yan et al., "Formation mechanism and process optimization of nano $Al_2O_3$-$ZrO_2$ eutectic ceramic via laser engineered net shaping (LENS)," *Ceramics International*, 43:1-6 (2017).
Ye et al., "Mold-free fs laser shock micro forming and its plastic deformation mechanism," *Optics and Lasers in Engineering*, 67:74-82 (2015).
Yu, "Laser Diode Beam Spatial Combining," Ph.D. Thesis, Politecnico di Torino, 106 pages (Jun. 6, 2017).
Yusuf et al., "Influence of energy density on metallurgy and properties in metal additive manufacturing," *Materials Science and Technology*, 33:1269-1289 (Feb. 15, 2017).
Zavala-Arredondo et al., "Diode area melting single-layer parametric analysis of 316L stainless steel powder," *Int. J. Adv. Manuf. Technol.*, 94:2563-2576 (Sep. 14, 2017).
Zavala-Arredondo et al., "Laser diode area melting for high speed additive manufacturing of metallic components," *Materials and Design*, 117:305-315 (Jan. 3, 2017).
Zheng et al., "Bending losses of trench-assisted few-mode optical fibers," *Applied Optics*, 55:2639-2648 (Apr. 1, 2016).
Zhirnov et al., "Laser beam profiling: experimental study of its influence on single-track formation by selective laser melting," *Mechanics & Industry*, 16:709-1-709-6 (2015).
Zhu et al., "Effect of processing parameters on microstructure of laser solid forming Inconel 718 superalloy," *Optics and Laser Technology*, 98:409-415 (Sep. 5, 2017).
Zhu et al., "Gaussian beam shaping based on multimode interference," *Proc. of SPIE, Laser Resonators and Beam Control XII*, 7579:75790M-1-75790M-11 (2010).
Zou et al., "Adaptive laser shock micro-forming for MEMS device applications," *Optics Express*, 25:3875-3883 (Feb. 20, 2017).
Balazic, Matej; Additive Manufacturing and 3D Printing LENS Technology; http://www.lorteck.es/files/fab-aditiva/efesto-ik4-lortek-27-November-2013.pdf; Year 2013.
Khairallah et al.; Laser powder-bed fusion additive manufacturing; Effects of main physical processes on dynamical melt flow and pore formation from mesoscopic powder simulation, LLNL-JRNL-676495, Year 2015.
OPTOMEC; Enhanced LENS Thermal Imaging Capabilities Introduced by Optomec; Year 2013.
Van Newkirk et al; "Ultrasensitive vector bending sensor based on multicore optical fiber;" Opt Lett 41 32-835 (Year 2016).
Salceda-Delgado et al.; "Compact fiber-optic curvature sensor based on super-mode interference in a seven-core fiber:" Opt. Letter 40; 1468-1471; (Year 2015).
Bending Machine; CBC Alta Technolgia Italiana, General Catalog, pp. 96-97, (Year 2011).
UNI-42; Wayback capture—216-07-27; Curvatubi elettrica digitale, Year 2016.
Argyros et al.; Bend loss in highly mulitmode fibres; Optics Express; vol. 16, No. 23 ; (Year 2008).
Fini et al.; Bend distortion in large -mode-area amplifier fiber design, PROC SPIE 6781; Passive components and fiber-based devices, IV 67810; Nov. 21, 207; doi 10.11712.745949 (Year 2007).
Jacobs Joshu; "Suggested Guidelines for the Handling of Optical Fiber" Corning Incorporated; White paper; Dec. 2001; 8 pages.
UNI-60-COMBI-2; Frame-grab of You-Tube video published Sep. 26, 2011 (Year 2011).
International Search Report and Written Opinion for International Application No. PCT/US2013/060470, 7 pages, dated Jan. 16, 2014.
International Search Report and Written Opinion for International Application No. PCT/US2014/017841, 5 pages, dated Jun. 5, 2014.
International Search Report and Written Opinion for International Application No. PCT/US2014/017836, 6 pages, dated Jun. 10, 2014.
International Search Report and Written Opinion for related International Application No. PCT/US2016/041526, 6 pages, dated Oct. 20, 2016.
International Search Report and Written Opinion for related International Application No. PCT/US2016/053807, 6 pages, dated Jan. 19, 2017.
International Search Report and Written Opinion for International Application No. PCT/US2016/063086, 6 pages, dated Mar. 23, 2017.
International Search Report and Written Opinion for International Application No. PCT/US2017/014182, 9 pages, dated Mar. 31, 2017.
International Search Report and Written Opinion from International Application No. PCT/US2017/034848, dated Nov. 28, 2017, 15 pages.
International Search Report and Written Opinion from International Application No. PCT/US2018/015768, dated Jun. 11, 2018, 15 pages.
International Search Report and Written Opinion from International Application No. PCT/US2018/016305, dated Jun. 11, 2018, 10 pages.
International Search Report and Written Opinion from International Application No. PCT/US2018/016288: dated Jun. 11, 2018, 10 pages.
International Search Report and Written Opinion from International Application No. PCT/US2018/024145, dated Jun. 21, 2018, 5 pages.
International Search Report and Written Opinion from International Application No. PCT/US2018/015710, dated Jun. 25, 2018, 17 pages.
International Search Report and Written Opinion from International Application No. PCT/US2018/024548, dated Jun. 28, 2018, 6 pages.
International Search Report and Written Opinion for International Application No. PCT/US2018/015895, dated Jul. 10, 2018, 10 pages.
International Search Report and Written Opinion from International Application No. PCT/US2018/024510, dated Jul. 12, 2018, 6 pages.
International Search Report and Written Opinion for International Application No. PCT/US2018/024944, dated Jul. 12, 2018, 8 pages.
International Search Report and Written Opinion from International Application No. PCT/US2018/024974, dated Jul. 12, 2018, 6 pages.
International Search Report and Written Opinion from International Application No. PCT/US2018/022629, dated Jul. 26, 2018, 11 pages.
International Search Report and Written Opinion for International Application No. PCT/US2018/023944, dated Aug. 2, 2018, 7 pages.
International Search Report and Written Opinion for International Application No. PCT/US2018/026110, 12 pages, dated Aug. 8, 2018.
International Search Report and Written Opinion from International Application No. PCT/US2018/023012, dated Aug. 9, 2018, 7 pages.
International Search Report and Written Opinion for International Application No. PCT/US2018/023963, dated Aug. 9, 2018, 7 pages.
International Search Report and Written Opinion for International Application No. PCT/US2018/024899, dated Aug. 9, 2018, 7 pages.
International Search Report and Written Opinion for International Application No. PCT/US2018/024955, dated Aug. 9, 2018, 8 pages.
International Search Report and Written Opinion for International Application No. PCT/US2018/024953, dated Aug. 16, 2018, 8 pages.
International Search Report and Written Opinion from International Application No. PCT/US2018/024954: dated Aug. 23, 2018, 7 pages.
International Search Report and Written Opinion from International Application No. PCT/US2018/024958, dated Aug. 23, 2018, 6 pages.
International Search Report and Written Opinion from International Application No. PCT/US2018/024227, dated Aug. 30, 2018, 7 pages.
International Search Report and Written Opinion from International Application No. PCT/US2018/024904, dated Aug. 30, 2018, 5 pages.

(56) References Cited

OTHER PUBLICATIONS

International Search Report and Written Opinion from International Application No. PCT/US2018/024971, dated Aug. 30, 2018, 8 pages.
International Search Report and Written Opinion from International Application No. PCT/US2018/024907, dated Sep. 27, 2018, 6 pages.
"Business Unit Laser Ablation and Cutting: Laser Beam Fusion Cutting with Dynamic Beam Shaping," Fraunhofer IWS Annual Report 2015, pp. 86-87 (2015).
Goppold et al., "Dynamic Beam Shaping Improves Laser Cutting of Thick Steel Plates," Industrial Photonics, 4:18-19 (Jul. 2017).
International Search Report and Written Opinion from International Application No. PCT/US2018/024959, dated Jun. 28, 2018, 7 pages.
International Search Report and Written Opinion from International Application No. PCT/US2018/024641, dated Jul. 12, 2018, 6 pages.
International Search Report and Written Opinion from International Application No. PCT/US2018/024889, dated Jul. 26, 2018, 5 pages.
International Search Report and Written Opinion from International Application No. PCT/US2018/023009, dated Aug. 9, 2018, 8 pages.
Ivanov et al., "Fiber-Optic Bend Sensor Based on Double Cladding Fiber," *Journal of Sensors*, 2015, 6 pages (2015).
Ivanov et al., "Fiber structure based on a depressed inner cladding fiber for bend, refractive index and temperature sensing," *Meas. Sci. Technol.*, 25:1-8 (2014).
Nazemosadat et al., "Saturable absorption in multicore fiber couplers," *J. Opt. Soc. Am. B*, 30:2787-2790 (Nov. 2013).
Tam et al., "An imaging fiber-based optical tweezer array for microparticle array assembly," *Appl. Phys. Lett.*, 84:4289-4291 (May 7, 2004).
Adelman et al., "Measurement of Relative State-to-State Rate Constants for the Reaction $D + H_2(v, j) \rightarrow HD(v', j') + H$," *J. Chem. Phys.*, 97:7323-7341 (Nov. 15, 1992).
Alfano et al., "Photodissociation and Recombination Dynamics of $I_2$—in Solution," *Ultrafast Phenomena VIII*, (Springer-Verlag, New York), pp. 653-655 (Jan. 1993).
"ARM," Coherent, available at: http://www.corelase.fi/products/arm/, 6 pages, retrieved May 26, 2017.
Bernasconi et al., "Kinetics of Ionization of Nitromethane and Phenylnitromethane by Amines and Carboxylate Ions in $Me_2SO$-Water Mixtures. Evidence of Ammonium Ion-Nitronate Ion Hydrogen Bonded Complex Formation in $Me_2SO$-Rich Solvent Mixtures," *J. Org. Chem.*, 53:3342-3351 (Jul. 1988).
Blake et al., "The $H + D_2$ Reaction: $HD(v=1, J)$ and $HD(v=2, J)$ Distributions at a Collision Energy of 1.3 eV," *Chem. Phys. Lett.*, 153:365-370 (Dec. 23, 1988).
Daniel et al., "Novel technique for mode selection in a large-mode-area fiber laser," Conference on Lasers and Electro-Optics 2010, OSA Technical Digest (CD) (Optical Society of America), paper CWC5, 2 pages (Jan. 2010).
Daniel et al., "Novel technique for mode selection in a multimode fiber laser," Optics Express, 19:12434-12439 (Jun. 20, 2011).
Di Teodoro et al., "Diffraction-Limited, 300-kW Peak-Power Pulses from a Coiled Multimode Fiber Amplifier," *Optics Letters*, 27:518-520 (May 2002).
Di Teodoro et al., "Diffraction-limited, 300-kW-peak-power Pulses from a Yb-doped Fiber Amplifier," *Conference on Lasers and Electro-Optics*, OSA Technical Digest (Optical Society of America, Washington, DC), p. 592-593 (May 22-24, 2002).
Di Teodoro et al., "High-peak-power pulsed fiber sources," *Proc. of SPIE*, 5448:561-571 (Sep. 20, 2004).
"Efficient and Simple Precision, Laser Processing Head PDT-B," HIGHYAG, 6 pages, (Jan. 2010).
Eichenholz, "Photonic-crystal fibers have many uses," Optoelectronics World, 4 pages (Aug. 2004).
"ENSIS Series," Amada America, Inc., available at: http://www.amada.com/america/ensis-3015-aj, 2 pages, retrieved May 26, 2017.

"EX-F Series," MC Machinery Systems, Inc., available at: https://www.mcmachinery.com/products-and-solutions/ex-f-series/, 2 pages, retrieved May 26, 2017.
Farrow et al., "Bend-Loss Filtered, Large-Mode-Area Fiber Amplifiers: Experiments and Modeling," Proceedings of the Solid State and Diode Laser Technology Review (Directed Energy Professional Society), p. 9, 5 pages (2006).
Farrow et al., "Compact Fiber Lasers for Efficient High-Power Generation," *Proc. of SPIE*, 6287:62870C-1-62870C-6 (Sep. 1, 2006).
Farrow et al., "Design of Refractive-Index and Rare-Earth-Dopant Distributions for Large-Mode-Area Fibers Used in Coiled High-Power Amplifiers," *Proc. of SPIE*, 6453:645310-1-64531C-11 (Feb. 2, 2007).
Farrow et al., "High-Peak-Power (>1.2 MW) Pulsed Fiber Amplifier," *Proc. of SPIE*, 6102:61020L-1-61020L-11 (Mar. 2006).
Farrow et al., "Numerical Modeling of Self-Focusing Beams in Fiber Amplifiers," *Proc. of SPIE*, 6453:645309-1-645309-9 (2007).
Farrow et al., "Peak-Power Limits on Pulsed Fiber Amplifiers Imposed by Self-Focusing," *Optics Lett.*, 31:3423-3425 (Dec. 1, 2006).
Fève et al., "Four-wave mixing in nanosecond pulsed fiber amplifiers," *Optics Express*, 15:4647-4662 (Apr. 16, 2007).
Fève et al., "Limiting Effects of Four-Wave Mixing in High-Power Pulsed Fiber Amplifiers," *Proc. of SPIE*, 6453:64531P-1-64531P-11 (Feb. 22, 2007).
Final Office action from U.S. Appl. No. 15/607,411, dated Feb. 1, 2018, 27 pages.
Final Office action from U.S. Appl. No. 15/607,399, dated May 3, 2018, 31 pages.
Final Office action from U.S. Appl. No. 15/607,410, dated May 11, 2018, 29 pages.
Fini, "Bend-compensated design of large-mode-area fibers," Optics Letters, 31:1963-1965 (Jul. 1, 2006).
Fini, "Large mode area fibers with asymmetric bend compensation," Optics Express, 19:21868-21873 (Oct. 24, 2011).
Fini et al., "Bend-compensated large-mode-area fibers: achieving robust single-modedness with transformation optics," Optics Express, 21:19173-19179 (Aug. 12, 2013).
Fox et al., "Effect of low-earth orbit space on radiation-induced absorption in rare-earth-doped optical fibers," *J. Non-Cryst. Solids*, 378:79-88 (Oct. 15, 2013).
Fox et al., "Gamma Radiation Effects in Yb-Doped Optical Fiber," *Proc. of the SPIE*, 6453:645328-1-645328-9 (Feb. 23, 2007).
Fox et al., "Gamma-Radiation-Induced Photodarkening in Unpumped Optical Fibers Doped with Rare-Earth Constituents," *IEEE Trans. on Nuclear Science*, 57:1618-1625 (Jun. 2010).
Fox et al., "Investigation of radiation-induced photodarkening in passive erbium-, ytterbium-, and Yb/Er co-doped optical fibers," *Proc. of the SPIE*, 6713:67130R-1-67130R-9 (Sep. 26, 2007).
Fox et al., "Radiation damage effects in doped fiber materials," *Proc. of the SPIE*, 6873:68731F-1-68731F-9 (Feb. 22, 2008).
Fox et al., "Spectrally Resolved Transmission Loss in Gamma Irradiated Yb-Doped Optical Fibers," *IEEE J. Quant. Electron.*, 44:581-586 (Jun. 2008).
Fox et al., "Temperature and Dose-Rate Effects in Gamma Irradiated Rare-Earth Doped Fibers," *Proc. of SPIE*, 7095:70950B-1-70950B-8 (Aug. 26, 2008).
Ghasemi et al., "Beam shaping design for coupling high power diode laser stack to fiber," *Applied Optics*, 50:2927-2930 (Jun. 20, 2011).
Ghatak et al., "Design of Waveguide Refractive Index Profile to Obtain Flat Model Field," SPIE, 3666:40-44 (Apr. 1999).
Goers et al., "Development of a Compact Gas Imaging Sensor Employing cw Fiber-Amp-Pumped PPLN OPO," *Conference on Lasers and Electro-Optics*, OSA Technical Digest (Optical Society of America, Washington, DC), p. 521 (May 11, 2001).
Goldberg et al., "Deep UV Generation by Frequency Tripling and Quadrupling of a High-Power Modelocked Semiconductor Laser," Proceedings of the Quantum Electronics and Laser Science Conference, QPD18-2 (Baltimore) 2 pages (May 1995).

(56) References Cited

OTHER PUBLICATIONS

Goldberg et al., "Deep UV Generation by Frequency Quadrupling of a High-Power GaAlAs Semiconductor Laser," *Optics Lett.*, 20:1145-1147 (May 15, 1995).
Goldberg et al., "High Efficiency 3 W Side-Pumped Yb Fiber Amplifier and Laser," *Conference on Lasers and Electro-Optics*, OSA Technical Digest (Optical Society of America, Washington, DC), p. 11-12 (May 24, 1999).
Goldberg et al., "Highly Efficient 4-W Yb-Doped Fiber Amplifier Pumped by a Broad-Stripe Laser Diode," *Optics Lett.*, 24:673-675 (May 15, 1999).
Goldberg et al., "High-Power Superfluorescent Source with a Side-Pumped Yb-Doped Double-Cladding Fiber," *Optics Letters*, 23:1037-1039 (Jul. 1, 1998).
Goldberg et al., "Tunable UV Generation at 286 nm by Frequency Tripling of a High-Power Modelocked Semiconductor Laser," *Optics Lett.*, 20:1640-1642 (Aug. 1, 1995).
Golub, "Laser Beam Splitting by Diffractive Optics," *Optics and Photonics News*, 6 pages (Feb. 2004).
Han et al., "Reshaping collimated laser beams with Gaussian profile to uniform profiles," *Applied Optics*, 22:3644-3647 (Nov. 15, 1983).
Headrick et al., "Application of laser photofragmentation-resonance enhanced multiphoton ionization to ion mobility spectrometry," *Applied Optics*, 49:2204-2214 (Apr. 10, 2010).
Hemenway et al., "Advances in high-brightness fiber-coupled laser modules for pumping multi-kW CW fiber lasers," Proceedings of SPIE, 10086:1008605-1-1008605-7 (Feb. 22, 2017).
Hemenway et al.," High-brightness, fiber-coupled pump modules in fiber laser applications," *Proc. of SPIE*, 8961:89611V-1-89611V-12 (Mar. 7, 2014).
Hoops et al., "Detection of mercuric chloride by photofragment emission using a frequency-converted fiber amplifier," *Applied Optics*, 46:4008-4014 (Jul. 1, 2007).
Hotoleanu et al., "High Order Mode Suppression in Large Mode Area Active Fibers by Controlling the Radial Distribution of the Rare Earth Dopant," *Proc. of the SPIE*, 6102:61021T-1-61021T-8 (Feb. 23, 2006).
"How to Select a Beamsplitter," IDEX—Optics & Photonics Marketplace, available at: https://www.cvilaseroptics.com/file/general/beamSplitters.pdf, 5 pages (Jan. 8, 2014).
Huang et al., "Double-cutting beam shaping technique for high-power diode laser area light source," *Optical Engineering*, 52:106108-1-106108-6 (Oct. 2013).
Injeyan et al., "Introduction to Optical Fiber Lasers," High-Power Laser Handbook, pp. 436-439 (2011).
Ishiguro et al., "High Efficiency 4-kW Fiber Laser Cutting Machine," *Rev. Laser Eng.*, 39:680-684 (May 21, 2011).
Johnson et al., "Experimental and Theoretical Study of Inhomogeneous Electron Transfer in Betaine: Comparisons of Measured and Predicted Spectral Dynamics," *Chem. Phys.*, 176:555-574 (Oct. 15, 1993).
Johnson et al., "Ultrafast Experiments on the Role of Vibrational Modes in Electron Transfer," *Pure and Applied Chem.*, 64:1219-1224 (May 1992).
Kliner, "Novel, High-Brightness, Fibre Laser Platform for kW Materials Processing Applications," 2015 European Conference on Lasers and Electro-Optics—European Quantum Electronics Conference (Optical Society of America, 2015), paper CJ_11_2, 1 page (Jun. 21-25, 2015).
Kliner et al., "4-kW fiber laser for metal cutting and welding," *Proc. of SPIE*, 7914:791418-791418-8 (Feb. 22, 2011).
Kliner et al., "Comparison of Experimental and Theoretical Absolute Rates for Intervalence Electron Transfer," *J. Am. Chem. Soc.*, 114:8323-8325 (Oct. 7, 1992).
Kliner et al., "Comparison of Experimental and Theoretical Integral Cross Sections for D + $H_2$(v=1, j=1) → HD(v'=1, j') + H," *J. Chem. Phys.*, 95:1648-1662 (Aug. 1, 1991).
Kliner et al., "D + $H_2$(v=1, J=1): Rovibronic State to Rovibronic State Reaction Dynamics," *J. Chem. Phys.*, 92:2107-2109 (Feb. 1, 1990).
Kliner et al. "Effect of Indistinguishable Nuclei on Product Rotational Distributions: H + HI → $H_2$ + I reaction$^a$)," *J. Chem. Phys.*, 90:4625-4327 (Apr. 15, 1989).
Kliner et al., "Efficient second, third, fourth, and fifth harmonic generation of a Yb-doped fiber amplifier," *Optics Communications*, 210:393-398 (Sep. 15, 2002).
Kliner et al., "Efficient UV and Visible Generation Using a Pulsed Yb-Doped Fiber Amplifier," *Conference on Lasers and Electro-Optics*, OSA Technical Digest (Optical Society of America, Washington, DC), p. CPDC10-1-CPDC10-3 (May 19-22, 2002).
Kliner et al., "Efficient visible and UV generation by frequency conversion of a mode-filtered fiber amplifier," *Proc. of SPIE*, 4974:230-235 (Jul. 3, 2003).
Kliner et al., "Fiber laser allows processing of highly reflective materials," *Industrial Laser Solutions*, 31:1-9 (Mar. 16, 2016).
Kliner et al., "High-Power Fiber Lasers," *Photonics & Imaging Technology*, pp. 2-5 (Mar. 2017).
Kliner et al., "Laboratory Investigation of the Catalytic Reduction Technique for Detection of Atmospheric $NO_y$," *J. Geophys. Res.*, 102:10759-10776 (May 20, 1997).
Kliner et al., "Laser Reflections: How fiber laser users are successfully processing highly reflective metals," Shop Floor Lasers, available at: http://www.shopfloorlasers.com/laser-cutting/fiber/354-laser-reflections, 9 pages (Jan./Feb. 2017).
Kliner et al., "Measurements of Ground-State OH Rotational Energy-Transfer Rates," *J. Chem. Phys.*, 110:412-422 (Jan. 1, 1999).
Kliner et al., "Mode-Filtered Fiber Amplifier," Sandia National Laboratories—Brochure, 44 pages (Sep. 13, 2007).
Kliner et al., "Narrow-Band, Tunable, Semiconductor-Laser-Based Source for Deep-UV Absorption Spectroscopy," *Optics Letters*, 22:1418-1420 (Sep. 15, 1997).
Kliner et al., "Overview of Sandia's fiber laser program," Proceedings of SPIE—The International Society for Optical Engineering, 6952:695202-1-695202-12 (Apr. 14, 2008).
Kliner et al., "Photodissociation and Vibrational Relaxation of $I_2$ in Ethanol," *J. Chem. Phys.*, 98:5375-5389 (Apr. 1, 1993).
Kliner et al., "Photodissociation Dynamics of $I_2$ in Solution," *Ultrafast Reaction Dynamics and Solvent Effects*, (American Institute of Physics, New York), pp. 16-35 (Feb. 1994).
Kliner et al., "Polarization-Maintaining Amplifier Employing Double-Clad, Bow-Tie Fiber," *Optics Lett.*, 26:184-186 (Feb. 15, 2001).
Kliner et al., "Power Scaling of Diffraction-Limited Fiber Sources," *Proc. of SPIE*, 5647:550-556 (Feb. 21, 2005).
Kliner et al., "Power Scaling of Rare-Earth-Doped Fiber Sources," *Proc. of SPIE*, 5653:257-261 (Jan. 12, 2005).
Kliner et al., "Product Internal-State Distribution for the Reaction H + HI → $H_2$ + I," *J. Chem. Phys.*, 95:1663-1670 (Aug. 1, 1991).
Kliner et al., "The D + $H_2$ Reaction: Comparison of Experiment with Quantum-Mechanical and Quasiclassical Calculations," *Chem. Phys. Lett.*, 166:107-111 (Feb. 16, 1990).
Kliner et al., "The H+*para*-$H_2$ reaction: Influence of dynamical resonances on $H_2$(v' = 1, j' = 1 and 3) Integral Cross Sections," *J. Chem. Phys.*, 94:1069-1080 (Jan. 15, 1991).
Koplow et al., "A New Method for Side Pumping of Double-Clad Fiber Sources," *J. Quantum Electronics*, 39:529-540 (Apr. 4, 2003).
Koplow et al., "Compact 1-W Yb-Doped Double-Cladding Fiber Amplifier Using V-Groove Side-Pumping," *IEEE Photonics Technol. Lett.*, 10:793-795 (Jun. 1998).
Koplow et al., "Development of a Narrowband, Tunable, Frequency-Quadrupled Diode Laser for UV Absorption Spectroscopy," *Appl. Optics*, 37:3954-3960 (Jun. 20, 1998).
Koplow et al., "Diode-Bar Side-Pumping of Double-Clad Fibers," *Proc. of SPIE*, 5709:284-300 (Apr. 22, 2005).
Koplow et al., "High Power PM Fiber Amplifier and Broadband Source," *Optical Fiber Communication Conference*, OSA Technical Digest (Optical Society of America, Washington, DC), p. 12-13 (Mar. 7-10, 2000).
Koplow et al., "Polarization-Maintaining, Double-Clad Fiber Amplifier Employing Externally Applied Stress-Induced Birefringence," *Optics Lett.*, 25:387-389 (Mar. 15, 2000).
Koplow et al., "Single-mode operation of a coiled multimode fiber amplifier," Optics Letters, 25:442-444 (Apr. 1, 2000).

(56) References Cited

OTHER PUBLICATIONS

Koplow et al., "Use of Bend Loss to Obtain Single-Transverse-Mode Operation of a Multimode Fiber Amplifier," *Conference on Lasers and Electro-Optics*, OSA Technical Digest (Optical Society of America, Washington, DC), p. 286-287 (May 7-12, 2000).

Koplow et al., "UV Generation by Frequency Quadrupling of a Yb-Doped Fiber Amplifier," *IEEE Photonics Technol. Lett.*, 10:75-77 (Jan. 1998).

Koponen et al., "Photodarkening Measurements in Large-Mode-Area Fibers," *Proc. of SPIE*, 6453:64531E-1-64531E-12 (Feb. 2007).

Kotlyar et al., "Asymmetric Bessel-Gauss beams," J. Opt. Soc. Am. A, 31:1977-1983 (Sep. 2014).

Kulp et al., "The application of quasi-phase-matched parametric light sources to practical infrared chemical sensing systems," *Appl. Phys. B*, 75:317-327 (Jun. 6, 2002).

"Laser cutting machines," TRUMPF, available at: http://www.us.trumpf.com/en/products/machine-tools/products/2d-laser-cutting/innovative-technology/brightline.html, 9 pages, retrieved May 26, 2017.

"Lasers & Fibers," NKT Photonics, available at: https://www.nktphotonics.com/lasers-fibers/technology/photonic-crystal-fibers/, 4 pages, retrieved Feb. 13, 2018.

Longhi et al., "Self-focusing and nonlinear periodic beams in parabolic index optical fibres," J. Opt. B: Quantum Semiclass. Opt., 6:S303-S308 (May 2004).

Maechling et al., "Sum Frequency Spectra in the C-H Stretch Region of Adsorbates on Iron,"*Appl. Spectrosc.*, 47:167-172 (Feb. 1, 1993).

McComb et al., "Pulsed Yb:fiber system capable of >250 kW peak power with tunable pulses in the 50 ps to 1.5 ns range," *Proc. of SPIE*, 8601:86012T-1-86012T-11 (Mar. 23, 2013).

Moore et al., "Diode-bar side pumping of double-clad fibers," *Proc. of SPIE*, 6453:64530K-1-64530K-9 (Feb. 20, 2007).

Neuhauser et al., "State-to-State Rates for the D + $H_2(v = 1, j = 1)$ → HD(v', j') + H Reaction: Predictions and Measurements," *Science*, 257:519-522 (Jul. 24, 1992).

Office action from U.S. Appl. No. 15/607,399, dated Sep. 20, 2017, 25 pages.

Office action from U.S. Appl. No. 15/607,411, dated Sep. 26, 2017, 15 pages.

Office action from U.S. Appl. No. 15/607,410, dated Oct. 3, 2017, 32 pages.

Price et al., "High-brightness fiber-coupled pump laser development," *Proc. of SPIE*, 7583:758308-1-758308-7 (Feb. 2010).

Rinnen et al., "Construction of a Shuttered Time-of-Flight Mass Spectrometer for Selective Ion Detection," *Rev. Sci. Instrum.*, 60:717-719 (Apr. 1989).

Rinnen et al., "Effect of Indistinguishable Nuclei on Product Rotational Distributions: D + DI → $D_2$ + I," *Chem. Phys. Lett.*, 169:365-371 (Jun. 15, 1990).

Rinnen et al. "Quantitative Determination of HD Internal State Distributions via (2+1) REMPI," *Isr. J. Chem.*, 29:369-382 (Mar. 7, 1989).

Rinnen et al., "Quantitative determination of $H_2$, HD, and $D_2$ internal state distributions via (2+1) resonance-enhanced multiphoton ionization," *J. Chem. Phys.*, 95:214-225 (Jul. 1, 1991).

Rinnen et al., "The H + $D_2$ Reaction: "Prompt" HD Distributions at High Collision Energies," *Chem. Phys. Lett.*, 153:371-375 (Dec. 23, 1988).

Rinnen et al., "The H + $D_2$ Reaction: Quantum State Distributions at Collision Energies of 1.3 and 0.55 eV," *J. Chem. Phys.*, 91:7514-7529 (Dec. 15, 1989).

Romero et al., "Lossless laser beam shaping," *J. Opt. Soc. Am. A*, 13:751-760 (Apr. 1996).

Russell, "Photonic-Crystal Fibers," IEEE JLT, 24:4729-4749 (Dec. 2006).

Saleh et al., "Chapter 9.4 Holey and Photonic-Crystal Fibers," Fundamentals of Photonics, Second Edition, pp. 359-362 (2007).

Sanchez-Rubio et al., "Wavelength Beam Combining for Power and Brightness Scaling of Laser Systems," *Lincoln Laboratory Journal*, 20:52-66 (Aug. 2014).

Saracco et al., "Compact, 17 W average power, 100 kW peak power, nanosecond fiber laser system," *Proc. of SPIE*, 8601:86012U-1-86012U-13 (Mar. 22, 2013).

Schrader et al., "Fiber-Based Laser with Tunable Repetition Rate, Fixed Pulse Duration, and Multiple Wavelength Output," *Proc. of the SPIE*, 6453:64530D-164530D-9 (Feb. 20, 2007).

Schrader et al., "High-Power Fiber Amplifier with Widely Tunable Repetition Rate, Fixed Pulse Duration, and Multiple Output Wavelengths," *Optics Express*, 14:11528-11538 (Nov. 27, 2006).

Schrader et al., "Power scaling of fiber-based amplifiers seeded with microchip lasers," *Proc. of the SPIE*, 6871:68710T-1-68710T-11 (Feb. 2008).

Sheehan et al., "Faserlaser zur Bearbeitung hochreflektierender Materialien (Fiber laser processing of highly reflective materials)," *Laser*, 3:92-94 (Jun. 2017).

Sheehan et al. "High-brightness fiber laser advances remote laser processing," *Industrial Laser Solutions*, 31:1-9 (Nov. 2, 2016).

Sun et al., "Optical Surface Transformation: Changing the optical surface by homogeneous optic-null medium at will," *Scientific Reports*, 5:16032-1-16032-20 (Oct. 30, 2015).

Tominaga et al., "Femtosecond Experiments and Absolute Rate Calculations on Intervalence Electron Transfer in Mixed-Valence Compounds," *J. Chem. Phys.*, 98:1228-1243 (Jan. 15, 1993).

Tominaga et al., "Ultrafast Studies of Intervalence Charge Transfer," *Ultrafast Phenomena VIII*, (Springer-Verlag, New York), pp. 582- 584 (1993).

"Triple Clad Ytterbium-Doped Polarization Maintaining Fibers," nuFERN Driven to Light Specifications, 1 page (Jan. 2006).

Varshney et al., "Design of a flat field fiber with very small dispersion slope," Optical Fiber Technology, 9(3):189-198 (Oct. 2003).

Wetter et al., "High power cladding light strippers," Proc. of SPIE, 6873:687327-1-687327-8 (Jan. 21, 2008).

Xiao et al., "Fiber coupler for mode selection and high-efficiency pump coupling," Optics Letters, 38:1170-1172 (Apr. 1, 2013).

Yaney et al., "Distributed-Feedback Dye Laser for Picosecond UV and Visible Spectroscopy," *Rev. Sci. Instrum*, 71:1296-1305 (Mar. 2000).

Yu et al., "1.2-kW single-mode fiber laser based on 100-W high-brightness pump diodes," *Proc. of SPIE*, 8237:82370G-1-82370G-7 (Feb. 16, 2012).

FIBER SOURCE WITH CASCADED GAIN STAGES AND/OR MULTIMODE DELIVERY FIBER WITH LOW SPLICE LOSS

CROSS REFERENCE TO RELATED APPLICATION

This application is a continuation of U.S. patent application Ser. No. 15/074,838, filed Mar. 18, 2016, which claims the benefit of U.S. Provisional Patent Application No. 62/138,926, filed Mar. 26, 2015, both of which are incorporated by reference herein in their entirety.

FIELD

The disclosure pertains to low loss optical couplings in high power optical sources.

BACKGROUND

Conventional continuous-wave fiber sources are typically designed to achieve high average powers, such as several 100 s of W to several kW, in output beams exhibiting superior beam quality. In most cases, an output beam at or near the diffraction limit is highly desirable since it can be focused to a smaller spot resulting in higher irradiance capabilities. Due to various practical benefits, such beams are typically obtained with single-mode fiber laser system architectures using cascaded fiber gain stages. Even for cascaded fiber laser systems, however, single-mode performance is only achieved by making various tradeoffs with respect to cost, reliability, and performance.

Cascaded systems typically include a single-mode seed source, such as a single-mode fiber oscillator, one or more fiber oscillator or fiber amplifier stages coupled to the seed beam in order to scale its power, and a delivery fiber for delivering the beam to a target. In typical systems, the seed beam propagates in a core of a double clad fiber while pump light coupled into the cladding of the fiber provides an energy source for amplification of the seed beam. Subsequent amplification or delivery fiber stages use larger fiber cores to prevent the onset of detrimental non-linear effects associated with the beam and to increase pump absorption, but increasing fiber core size detrimentally allows the beam to propagate in various transverse modes higher than the preferred single, fundamental mode. Hence, various techniques are employed to maintain single-mode beam performance in large mode area (LMA) fibers.

One way to maintain single-mode performance between gain stages is to coil one or more stages, including the current, previous, or subsequent stage, so that the higher order modes are suppressed. Gain stages can also be carefully coupled to each other, such as with adiabatic fiber tapers, mode field adapters, or precision alignment so that the fundamental mode of the beam in a preceding gain stage is carefully matched or launched into the fundamental mode of the subsequent gain stage. A design in which the core diameter is simply increased with no other change in fiber parameters can cause excess splice loss because of modal mismatch between the fibers. Also, an increased core diameter can support additional modes, encouraging multimode propagation, unless the numerical aperture is decreased to compensate. In general, power coupling efficiency degradation or other optical loss associated with various gain stage couplings are necessary hindrances of achieving single-mode performance despite the increased cost of components (MFAs, thermal management) and attendant decrease in reliability from the additional components and lossy connections. A need therefore exists for innovation in high power continuous-wave systems without the aforementioned drawbacks.

SUMMARY

According to some examples of the disclosed technology, an apparatus includes an optical gain fiber having a core, a cladding surrounding the core, the core and cladding defining an optical gain fiber numerical aperture, and a multimode fiber having a core with a larger radius than a radius of the optical gain fiber core, a cladding surrounding the core, the core and cladding of the multimode fiber defining a multimode fiber stable numerical aperture that is larger than the optical gain fiber numerical aperture, the multimode fiber being optically coupled to the optical gain fiber so as to receive an optical beam propagating in the optical gain fiber and to stably propagate the received optical beam in the multimode fiber core.

According to additional examples of the disclosed technology, a method includes selecting core diameter and numerical aperture of a gain fiber and larger core diameter and larger numerical aperture of a receiving multimode fiber so that a beam parameter product of an optical beam coupled from the gain fiber to the receiving multimode fiber is above an unstable threshold and is stable, and optically coupling the gain fiber and receiving multimode fiber.

According to another aspect of the disclosed technology, a fiber laser system includes a fiber oscillator seed source for generating an optical beam, the fiber oscillator seed source having a core diameter and numerical aperture, at least one pump source optically coupled to the fiber oscillator seed source for optically pumping the fiber oscillator seed source, and a multimode fiber amplifier having a core diameter and numerical aperture, the multimode fiber amplifier being optically coupled to the fiber oscillator seed source with an optical splice so as to receive the optical beam, wherein the multimode fiber amplifier core diameter and numerical aperture are larger than the fiber oscillator seed source core diameter and numerical aperture so as to define a core diameter difference and numerical aperture difference, the differences being selected to provide substantially reduced optical loss and a stable beam parameter product.

The foregoing and other objects, features, and advantages of the invention will become more apparent from the following detailed description, which proceeds with reference to the accompanying figures which can include features not drawn to scale.

DETAILED DESCRIPTION

Figure 1:
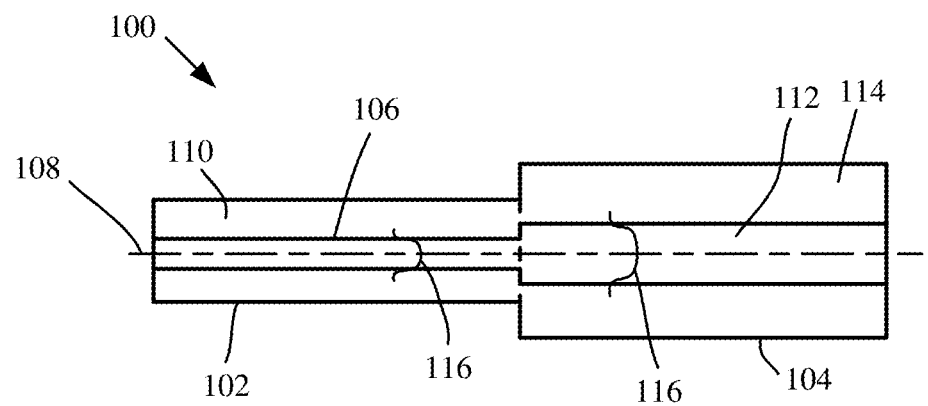
FIG. 1 is a schematic of an apparatus including optical fibers optically coupled with a splice.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

As used herein, optical radiation refers to electromagnetic radiation at wavelengths of between about 100 nm and 10 µm, and typically between about 500 nm and 2 µm. Examples based on available laser diode sources and optical fibers generally are associated with wavelengths of between about 800 nm and 1700 nm. In some examples, propagating optical radiation is referred to as one or more beams having diameters, beam cross-sectional areas, and beam divergences that can depend on beam wavelength and the optical systems used for beam shaping. For convenience, optical radiation is referred to as light in some examples, and need not be at visible wavelengths.

Representative embodiments are described with reference to optical fibers, but other types of optical waveguides can be used having square, rectangular, polygonal, oval, elliptical or other cross-sections. Optical fibers are typically formed of silica (glass) that is doped (or undoped) so as to provide predetermined refractive indices or refractive index differences. In some, examples, fibers or other waveguides are made of other materials such as fluorozirconates, fluoroaluminates, fluoride or phosphate glasses, chalcogenide glasses, or crystalline materials such as sapphire, depending on wavelengths of interest. Refractive indices of silica and fluoride glasses are typically about 1.5, but refractive indices of other materials such as chalcogenides can be 3 or more. In still other examples, optical fibers can be formed in part of plastics. In typical examples, a doped waveguide core such as a fiber core provides optical gain in response to pumping, and core and claddings are approximately concentric. In other examples, one or more of the core and claddings are decentered, and in some examples, core and cladding orientation and/or displacement vary along a waveguide length.

As used herein, numerical aperture (NA) refers to a largest angle of incidence with respect to a propagation axis defined by an optical waveguide for which propagating optical radiation is substantially confined. In optical fibers, fiber cores and fiber claddings can have associated NAs, typically defined by refractive index differences between a core and cladding layer, or adjacent cladding layers, respectively. While optical radiation propagating at such NAs is generally well confined, associated electromagnetic fields such as evanescent fields typically extend into an adjacent cladding layer. In some examples, a core NA is associated with a core/inner cladding refractive index, and a cladding NA is associated with an inner cladding/outer cladding refractive index difference. For an optical fiber having a core refractive index $n_{core}$ and a cladding index $n_{clad}$, a fiber core NA is NA=$\sqrt{n_{cors}^2-n_{clad}^2}$. For an optical fiber with an inner core and an outer core adjacent the inner core, a cladding NA is NA=$\sqrt{n_{inner}^2-n_{outer}^2}$, wherein $n_{inner}$ and $n_{outer}$ are refractive indices of the inner cladding and the outer cladding, respectively. Optical beams as discussed above can also be referred to as having a beam NA which is associated with a beam angular radius. While multi-core step index fibers are described below, gradient index designs can also be used.

In the examples disclosed herein, a waveguide core such as an optical fiber core is doped with a rare earth element such as Nd, Yb, Ho, Er, or other active dopants or combinations thereof. Such actively doped cores can provide optical gain in response to optical or other pumping. As disclosed below, waveguides having such active dopants can be used to form optical amplifiers, or, if provided with suitable optical feedback such as reflective layers, mirrors, Bragg gratings, or other feedback mechanisms, such waveguides can generate laser emissions. Optical pump radiation can be arranged to co-propagate and/or counter-propagate in the waveguide with respect to a propagation direction of an emitted laser beam or an amplified beam. In some examples, doped single-mode or doped multimode optical fibers are referred to as gain fibers, fiber oscillators, or fiber amplifiers, although it will be appreciated that such fibers typically include additional components as well, such as pump sources, pump couplers, and optical feedback elements, such as fiber Bragg gratings.

The term brightness is used herein to refer to optical beam power per unit area per solid angle. Selection of beam area and beam solid angle can produce pump beams that couple selected pump beam powers into one or more core or cladding layers of double, triple, or other multi-clad optical fibers.

FIG. 1 shows a cross-sectional schematic of a cascaded fiber laser apparatus 100 having an optical gain fiber 102 optically coupled to a multimode fiber 104 with an optical splice. The optical gain fiber 102 has a core 106 situated about an optical propagation axis 108 and a cladding 110 surrounding the core 106. The core and cladding have predetermined diameters or shapes defining corresponding cross-sectional areas. The core and cladding also have predetermined refractive indexes different from each other so as to define a numerical aperture associated with the core 106. Multimode fiber 104 includes a core 112 and cladding 114 having predetermined diameters or shapes defining cross-sectional areas, with the core 112 being larger than the core 106 of the optical gain fiber 102. The core and cladding of the multimode fiber 104 have predetermined refractive indexes different from each other so as to define a numerical aperture associated with the core 112 which is larger than the numerical aperture of the core 106. Optical gain fiber 102 and multimode fiber 104 can include one or more additional claddings or layers surrounding the claddings 110, 114.

An optical beam 116 propagating in the core 106 expands to fill the larger core 112 and to excite additional transverse modes associated with the multimode fiber 104. The amount by which the numerical aperture of the core 112 of the multimode fiber 104 exceeds the numerical aperture of the core 106 of the optical gain fiber 102 is selected so that an optical loss associated with the optical coupling of the spliced fibers 102, 104 is substantially reduced. In suitable examples, such substantial reduction corresponds to a low optical loss below 0.5% of total optical power of an optical beam transiting the optical coupling, though in additional examples such optical loss can be reduced to below 0.2%, 0.05%, or lower. An apparatus such as the apparatus 100 having optical gain fiber numerical apertures that are greater than or equal to multimode fiber numerical apertures may produce various desirable optical beam features (such as preservation of fundamental mode propagation) but also exhibit an optical loss associated with the optical coupling that varies according to selected fiber parameters but is generally from a few percent to several percent. For high power optical beams, including, for example, beam powers of several hundred watts to several kilowatts, a few percent loss can lead to premature degradation or failure of laser system components and an undesirable performance reduction, particularly for cascaded systems in which optical loss accumulates and compounds across multiple splices.

Optical losses for apparatuses such as the apparatus 100 can vary based on selected fiber parameters, such as with (but without limitation) the wavelength of the optical beam 116, the use of different optical fiber compositions and structures, or with different splicing tools used to generate the optical coupling splice. In general, in an optical coupling of a multimode fiber to a gain fiber, increases in multimode fiber numerical aperture above gain fiber numerical aperture are associated with minimal reduction in optical loss unless a threshold multimode numerical aperture or multimode fiber to gain fiber numerical aperture difference is exceeded. At such a loss threshold, a substantial reduction in optical loss is typically achieved. Additional reductions in optical loss can be obtained by further increasing multimode fiber numerical aperture, but generally with diminishing returns. It will be appreciated that low-loss multimode fiber numerical apertures can also be selected and the optical gain fiber core numerical aperture can be adjusted relative to the selected larger multimode fiber numerical aperture to achieve suitable low-loss optical coupling.

The numerical aperture of the core 112 is also selected so that a beam parameter product (bpp) associated with the optical beam is stable as opposed to unstable. Unstable numerical apertures produce optical beams with unstable bpps that are variable from apparatus to apparatus as fiber parameters, such as refractive indexes, shapes, diameters, splice positions, etc., for the optical gain fiber, multimode fiber, or other components vary according to normal tolerances. In general, such variable or unstable bpps associated with unstable numerical apertures are also higher, and therefore less desirable, than a bpp of the optical beam 116 in the multimode fiber 104 having a stable core numerical aperture. In suitable examples, stable or constant bpps associated with stable numerical apertures vary less than about 5%, 2%, 1%, or 0.5% from apparatus to apparatus according to normal manufacturing tolerances. Unstable numerical apertures can be observed that produce bpps which vary by greater than about 5%, 10%, 20%, 50%, or more between apparatuses based on a target bpp. Unstable numerical apertures can also produce unstable bpps that vary undesirably or unpredictably during operation of a particular apparatus, including at a selected output power or range of output powers. In some examples, an unstable bpp can vary by greater than about 5%, 10%, 20%, 50%, or more during operation of a laser apparatus.

Once a stable, low-loss numerical aperture, or numerical aperture difference, is obtained, as mentioned above, a smaller decrease in optical loss is achieved as the optical loss for the optical coupling approaches zero or other loss floor for each unit increase in multimode fiber numerical aperture or corresponding numerical aperture difference. Increasing numerical aperture in the multimode fiber (or decreasing the numerical aperture of the optical gain fiber) also tends to become less practical. For example, available materials to vary numerical aperture can limit the extent to which refractive index may be increased or decreased, or other fiber parameters, such as numerical apertures associated with the optical gain fiber or multimode fiber claddings 110, 114 can limit the extent of the selected difference between optically coupled core numerical apertures. An achievable stable multimode fiber numerical aperture can be selected in view of various laser parameters or constraints.

The stable multimode fiber numerical aperture, or the numerical aperture difference, can also be selected so that a numerical aperture margin is provided which allows the apparatus 100 to maintain a stable bpp or other stable characteristics of the optical beam 116 associated with the optical coupling as fiber parameters vary according to normal tolerances. In some examples, a stable multimode fiber numerical aperture is selected with a numerical aperture margin which is within 0.5%, 1%, 2%, 5%, 10%, 20%, or 50% of the stable multimode fiber numerical aperture. In other examples, a stable multimode fiber numerical aperture is selected with a margin of 0.01 $\Delta NA$, 0.1 $\Delta NA$, 0.5 $\Delta NA$, 1 $\Delta NA$, or 5 $\Delta NA$ above a multimode fiber numerical aperture value that is borderline stable or that just becomes stable. It will be appreciated that stable optical couplings with numerical aperture margin can also be obtained by adjusting an optical gain fiber core numerical aperture, both core numerical apertures, or the difference between the core numerical apertures.

In representative examples, optical gain fiber 102 is a single-mode fiber having a core diameter which only allows propagation of the optical beam 116 in the fundamental transverse $LP_{01}$ mode. In a particular example, the optical gain fiber 102 having the core 106 doped with ytterbium, a corresponding lasing wavelength of the optical beam 116 can be about 1080 nm. For a corresponding core numerical aperture of 0.06 NA, single-mode behavior occurs for diameters of less than about 10 µm. In other examples, optical gain fiber 102 has a few mode core or an LMA core with a diameter larger than a single-mode fiber so that the core 106 may be capable of supporting higher order modes. The higher order modes can be suppressed in different ways, such as through coiling of the fiber 102, photonic crystal microstructures, chirally coupled core microstructures, etc., so as to allow propagation of the optical beam 116 substantially in the fundamental transverse $LP_{01}$ mode only. The higher order modes can also be allowed to propagate so that the optical beam 116 propagating in the optical gain fiber 102 is multimode.

In a particular example, the optical gain fiber 102 has a ytterbium doped core 106 with a corresponding lasing wavelength of about 1080 nm. With a core numerical aperture of 0.0805 NA and a core diameter of 13.2 µm, single-mode $LP_{01}$ optical beam characteristics can be obtained through coiling of the optical gain fiber 102. Depending on the characteristics of the laser system associated with apparatus 100, optical gain fiber can be situated as a fiber oscillator, providing optical gain through feedback between reflective elements, or as a fiber amplifier, generating optical gain without substantial feedback. It will be appreciated that optical gain fiber 102 can include one or more optical fiber elements optically coupled or spliced together such that the optical fiber element optically coupled to the multimode fiber 104 may be a passive section of the optical gain fiber 102.

In representative examples of apparatus 100, multimode fiber 104 is a multimode gain fiber or a multimode fiber without active dopants, such as a multimode delivery fiber. The actively doped multimode fiber 104 includes the core 110 with a diameter larger than the diameter associated with the core 106 of the optical gain fiber 102. The core 110 of the multimode gain fiber is doped to provide optical gain to the optical beam 116 received from the optical gain fiber 102. It will be appreciated that actively doped multimode fiber 104 can include one or more optical fiber elements optically coupled or spliced together such that the optical fiber element optically coupled to the optical gain fiber 102 may be a passive section of the actively doped multimode fiber 104. Multimode fiber 104 examples can include multimode delivery fibers which typically lack active dopants along the entire length. Delivery fibers are typically used to direct the high power optical beam 116 to a target work surface.

In a particular example, the core 110 of the multimode fiber 104 is doped with ytterbium to provide laser amplification at 1080 nm and the diameter of the core 110 is about 39.2 µm. The numerical aperture of the core 110 is selected in relation to the numerical aperture of the core 106 so that the optically coupling of the optical gain fiber and multimode fiber is provided with low optical loss and so that the bpp of the optical beam 116 propagating in the multimode gain fiber is stable. A numerical aperture margin can be provided so that with fiber parameter variation within tolerances, different implementations of the apparatus 100 do not tend to operate with an unstable bpp. The diameters of the cores 106, 110 can also be adjusted to achieve a suitable numerical aperture or numerical aperture difference.

In a particular example, with the optical gain fiber 102 having a core numerical aperture of 0.0805 NA and a core diameter of 13.2 µm and providing the optical beam 116 at a wavelength of about 1080 nm, the multimode fiber 104 having a core numerical aperture of 0.10 and a core diameter of 39.2 um is optically coupled with a fusion splice to receive the optical beam 116 and to amplify the beam at 1080 nm. Little or no reduction in optical loss associated with the optical splice is observed for multimode fiber core numerical apertures less than about 0.09, the optical loss being about 2% of total optical beam power. Substantial reduction in optical loss is found for multimode fiber core numerical apertures greater than about 0.09 but variable bpp and other performance characteristics are found in the optical beam 116. At about 0.095, the multimode fiber core numerical aperture provides stable bpp for the optical beam 116 but normal variation in fiber parameters within tolerances from apparatus to apparatus can cause an apparatus to have an unstable bpp or other beam characteristics. At about 0.10, the multimode fiber core numerical aperture provides a loss very close to zero, with a stable bpp and with enough numerical aperture margin or buffer so that normal variation in fiber parameters for the optical gain fiber 102, multimode fiber 104, or other system components or operational characteristics, does not result in a significant number of variably performing apparatuses.

Figure 2:
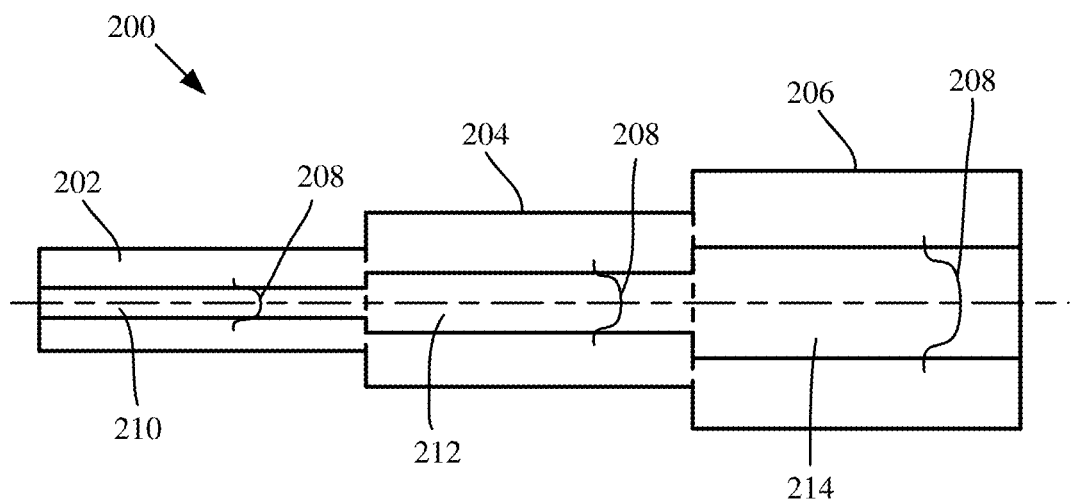
FIG. 2 is another schematic of an apparatus including optical fibers optically coupled with splices.

FIG. 2 shows a cross-sectional schematic of a fiber apparatus 200 which generally includes an optical gain fiber 202 optically coupled with a fusion splice to a multimode optical gain fiber 204 which is optically coupled with a fusion splice to a multimode fiber 206. An optical beam 208 is generated or amplified or both by propagation through the apparatus 200. The optical gain fiber 202 includes an active core 210 having a selected diameter and numerical aperture for generating or amplifying and also propagating the optical beam 208. Multimode optical gain fiber 204 includes an active core 212 having a selected diameter and numerical aperture which are larger than the core diameter and numerical aperture associated with the optical gain fiber 202. Multimode fiber 206 includes a core 214 having a selected diameter and numerical aperture which are larger than the core diameter and numerical aperture associated with the multimode optical gain fiber 204. Each core diameter and numerical aperture increase between adjacently optically coupled fibers is selected so that an optical loss associated with the optical coupling is substantially reduced and the bpp of the optical beam 208 is provided in a stable configuration in the downstream adjacent fiber. The selection of core and numerical aperture can also provide a variability margin that prevents the optical beam 208 from drifting into an unstable bpp range in view of fiber parameter variation according to normal tolerances in the manufacture of like apparatuses 200.

In a representative example, optical gain fiber 202 is a fiber oscillator situated to generate an optical beam substantially in the fundamental mode, the multimode optical gain fiber 204 is a multimode fiber amplifier situated to amplify the optical beam 208 received from the optical gain fiber 202, and the multimode fiber 206 is a multimode delivery fiber situated to receive the optical beam 208 which has been amplified by the optical gain fiber 204 and to deliver the beam 208 to a target. In various examples, optical gain fiber 202 can have a single-mode core, few-mode core, or a multimode core. In further examples, multimode fiber 206 can be an actively doped multimode fiber amplifier.

Figure 3:
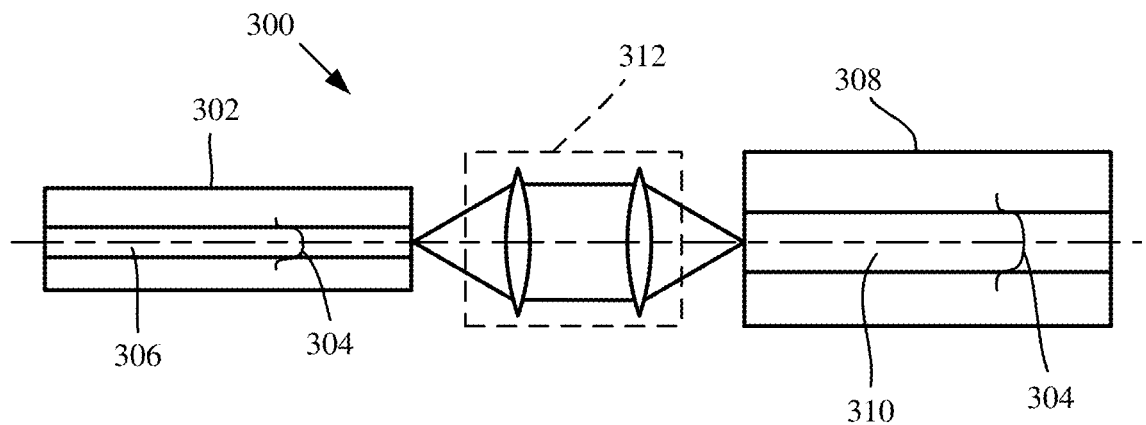
FIG. 3 is a schematic of an apparatus including optical fibers optically coupled with free space optics.

FIG. 3 shows a cross-sectional schematic of a fiber apparatus 300 which includes an optical gain fiber 302 situated to propagate an optical beam 304 in a core 306 thereof, a multimode optical fiber 308 situated to receive and propagate the beam 304 in a multimode core 310, and free-space optics 312 situated to receive the optical beam 304 from the optical gain fiber 302 and to couple the beam into the multimode core 310 of the multimode optical fiber 308. The diameters and numerical apertures of the cores 306, 310 are selected to substantially reduce optical loss that may be associated with the optical coupling of the beam 304 with the free-space optics 312 and to further provide the optical beam 304 with a stable bpp that varies minimally between apparatuses 300 given normal variation of fiber parameters according to specification tolerances.

Figure 4:
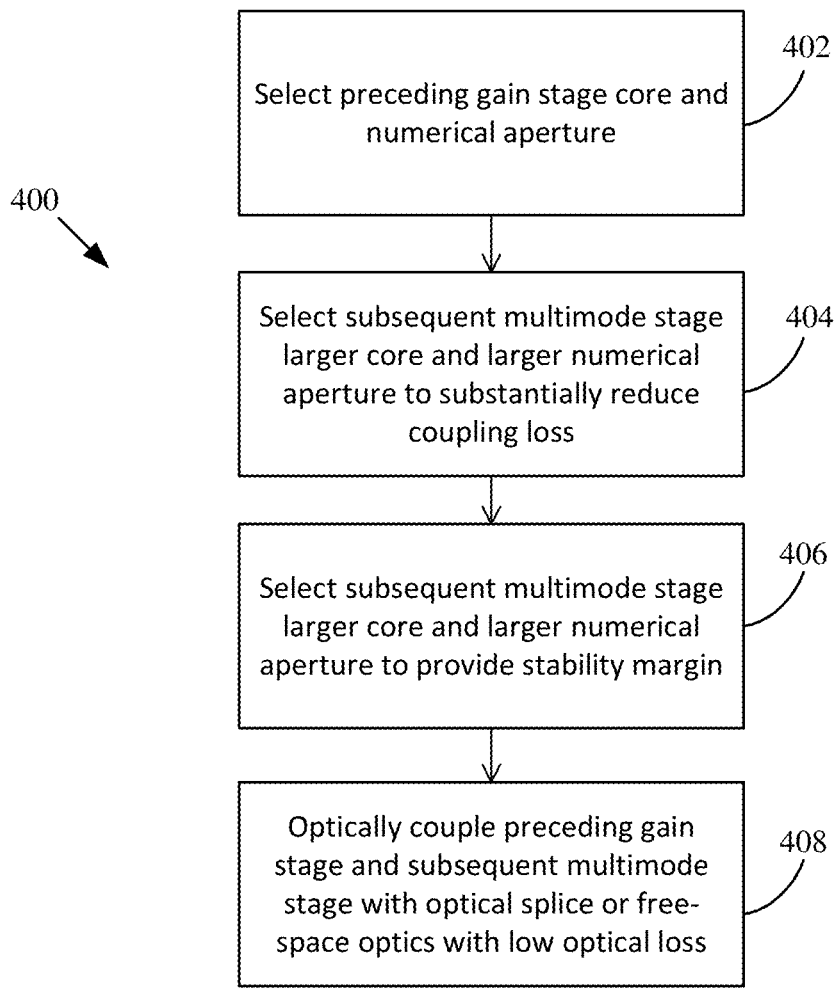
FIG. 4 is a flowchart of a method of reducing loss in an optical coupling between optical fibers.

In FIG. 4, an exemplary method 400 for providing a high power optical beam includes, at 402, selecting a preceding gain stage core diameter and core numerical aperture. At 404, a subsequent multimode stage core diameter and numerical aperture are selected which are larger than the core diameter and core numerical aperture of the preceding gain stage. The core diameters and numerical apertures are selected to provide a substantial reduction in coupling loss and stable optical beam characteristics, including bpp. The core diameters and numerical apertures can be further selected at 406 to provide a stability margin allowing repeatable low-loss and stable optical beam characteristics as fiber parameters may vary according to normal tolerances. At 408, the preceding gain stage and subsequent multimode stage are optically coupled via fusion splicing or free-space optics so that a high power optical beam is produced.

Figure 5:
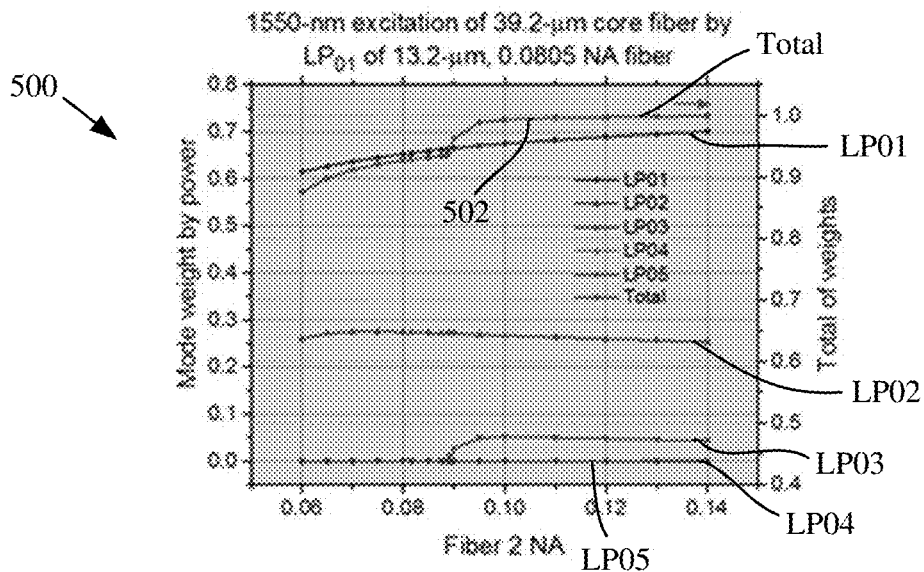
FIG. 5 is a plot of mode power content against numerical aperture of a receiving optical fiber.

FIG. 5 is a chart 500 depicting power of an optical beam for different numerical apertures of a multimode fiber spliced to and receiving the beam power from a preceding optical fiber. In particular, the preceding fiber propagates an optical beam at 1550 nm in the fundamental $LP_{01}$ mode through a core having a diameter of 13.2 µm and a core numerical aperture of 0.0805. The total optical beam power 502 in the multimode fiber with a core diameter of 39.2 µm is plotted against numerical aperture of the multimode fiber. When the core numerical aperture of the preceding fiber at 0.0805 is matched to the numerical aperture of the spliced multimode fiber receiving the optical beam, an optical coupling loss of around 7% is observed. It should be noted that for shorter wavelengths such optical coupling loss is typically lower, such as around 2%, and consequently more difficult to detect or more likely to be considered to be within a manufacturing tolerance.

As the core numerical aperture of the receiving multimode fiber is increased steadily to near 0.090 NA, a small decrease in optical loss is seen followed by a large decrease in optical loss from 0.090 NA to about 0.095 NA. The sudden decrease in optical loss at a threshold numerical aperture may be associated with a mode coupling threshold as the optical beam in the preceding fiber which can have fewer modes couples into the supported modes of the multimode fiber. For multimode fiber core numerical apertures above about 0.095 NA, diminishes to close to 0% optical loss. Also depicted in FIG. 5 are the various modal power contents for the modes of the optical beam propagating in the multimode fiber core for different multimode core numerical apertures.

Figure 6:
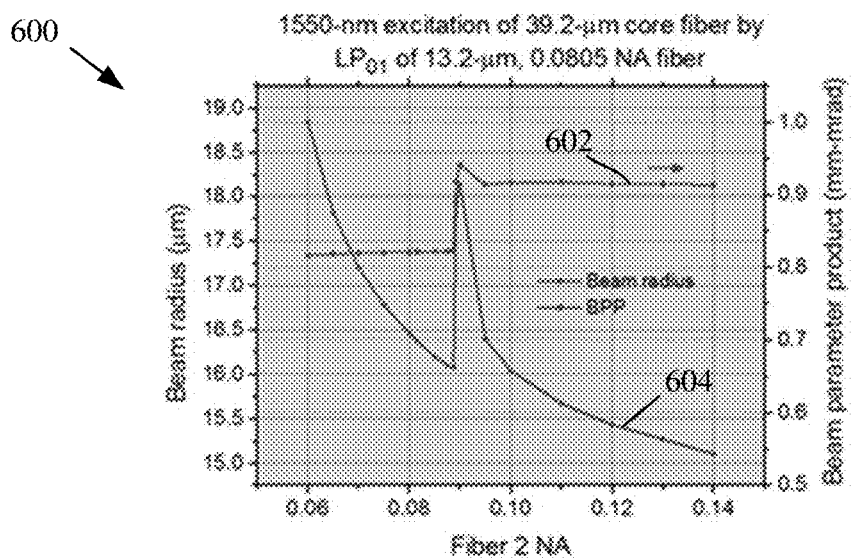
FIG. 6 is a plot of beam parameter product and beam radius against numerical aperture of a receiving fiber.

FIG. 6 is a chart 600 depicting bpp 602 and beam radius 604 for the optical beam in the multimode fiber, as described for FIG. 5, across a similar range of core numerical apertures of the multimode fiber. As numerical aperture of the multimode fiber core increases past a numerical aperture matched to the numerical aperture of the preceding fiber, bpp remains unchanged until the mode coupling threshold is reached. As the numerical aperture increases past the threshold, highly variable bpp and beam radius fluctuations are observed until a stable numerical aperture is reached. Once the stable numerical aperture is selected beam radius begins to decrease more smoothly without fluctuating behavior and the bpp becomes consistent with increasing multimode fiber core numerical aperture.

Figure 7:
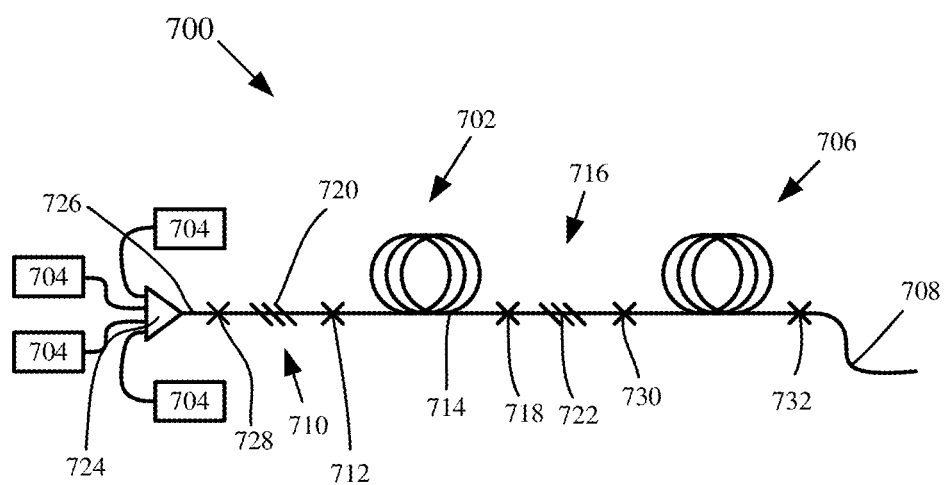
FIG. 7 is a schematic of a fiber laser system.

FIG. 7 is a schematic of a fiber laser system 700 which includes a fiber oscillator 702, a plurality of pump sources 704, a multimode fiber amplifier 706, and a delivery fiber 708. The fiber oscillator 702 gain fiber includes a high reflecting (HR) fiber portion 710 optically coupled with a splice 712 to an end of an actively doped fiber portion 714 and partial reflecting (PR) fiber portion 716 optically coupled with a splice 718 to an opposite end of the actively doped fiber portion 714. The HR fiber portion 710 includes a fiber Bragg grating (FBG) 720 written in its core, which can be active or passive, and which predominantly reflects light at a lasing wavelength associated with the actively doped fiber portion 714. HR reflectivities are typically at least about 80%, 95%, 99%, 99.9%, or higher. The PR fiber portion 716 includes an FBG 722 written in its core, which can be active or passive, and which both reflects and transmits light at the lasing wavelength. PR reflectivities can vary considerably depending on system gain requirements, such as being below 20%, 50%, 80%, 95%, or 99%. The pump sources 704 are optically coupled to a pump combiner 724 which combines and couples the light from the pump sources into a pump delivery fiber 726. The pump delivery fiber 726 is coupled to the HR fiber portion 710 via an optical splice 728. The pump light provides energy for laser feedback and amplification in the fiber oscillator and amplifier 702, 706.

The PR fiber portion 716 of the fiber oscillator 702 is optically coupled to the fiber amplifier 706 with an optical splice 730. A seed beam generated in the fiber oscillator 702 is thereby coupled into the fiber amplifier 706 for substantial amplification. The fiber amplifier 706 is optically coupled to the delivery fiber 708 at an optical splice 732. The delivery fiber 708 receives the amplified beam from the fiber amplifier 706 and directs the beam to a target (not shown). At optical splices 730, 732, the optical fiber cores step up in diameter typically resulting in an amount of undesirable optical loss. Numerical apertures of adjoining fibers at such optical splices are chosen to have a predetermined difference with the larger core downstream fiber having a larger numerical aperture than the upstream fiber. The numerical aperture difference is selected so as to provide the optically coupled beam with a substantially reduced loss, so that a propagating optical beam experiences a reduction in optical power of 0.5% or less in some examples. The numerical aperture difference can also be selected so that the bpp of the optically coupled beam does not experience substantial variability. A numerical aperture margin can be provided so that variation between manufactured fiber laser systems 700 due to manufacturing tolerances can buffer against the possibility of the characteristics of the beam, such as bpp or beam radius, of a system 700 of being variable or out of tolerance. Such margin can be selected to be below a numerical aperture difference that can cause a beam radius reduction that would exacerbate nonlinear effects or below a numerical aperture difference that is impractical due to limitations associated with fiber doping to achieve different numerical apertures or other system or fiber constraints such as cladding numerical apertures.

In view of the many possible embodiments to which the principles of the disclosed technology may be applied, it should be recognized that the illustrated embodiments are only representative examples and should not be taken as limiting the scope of the disclosure. Alternative specifically addressed in these sections are merely exemplary and do not constitute all possible alternatives to the embodiments described herein. For instance, various components of systems described herein may be combined in function and use. We therefore claim as our invention all that comes within the scope and spirit of these claims.

We claim:

1. A cascaded fiber laser, comprising:
   an optical gain fiber section having a first core, a first cladding surrounding the first core, the first core and first cladding defining a first numerical aperture (NA); and
   a first multimode fiber section coupled to the optical gain fiber, having a second core comprising a larger radius than a radius of the first core, a second cladding surrounding the second core, the second core and cladding defining a second NA that is larger than the first NA by a first margin selected to maintain a substantially stable beam parameter product (BPP) of an optical beam coupled from the optical gain fiber section into the multimode fiber section above a predetermined threshold stable BPP.

2. The cascaded fiber laser of claim 1, wherein the margin is associated with a low optical loss.

3. The cascaded fiber laser of claim 2, wherein the low optical loss amounts to a reduction in optical power of 0.5% or less in the optical beam upon propagation from the optical gain fiber section to the first multimode fiber section.

4. The cascaded fiber laser of claim 1, wherein the optical gain fiber section is a single-mode fiber.

5. The cascaded fiber laser of claim 1, wherein the selected margin is within 0.5%, 1%, 2%, 5%, 10%, 20%, or 50% of an identified stable margin value associated with the predetermined threshold stable BPP.

6. The cascaded fiber laser of claim 1, wherein the first multimode fiber section is optically coupled to the optical gain fiber section with a fusion optical splice.

7. The cascaded fiber laser of claim 1, wherein the first multimode fiber section is coupled to the optical gain fiber section with free-space optics.

8. The cascaded fiber laser of claim 1, wherein the optical gain fiber section is a fiber oscillator.

9. The cascaded fiber laser of claim 8, wherein the optical gain fiber section includes an optical fiber element coupled to the first multimode fiber section that is a passive portion of the optical gain fiber section.

10. The cascaded fiber laser of claim 1, wherein the optical gain fiber section is a few mode fiber.

11. The cascaded fiber laser of claim 10, further comprising one or more higher order mode suppression features.

12. The cascaded fiber laser of claim 1, wherein the first margin is selected so as to provide a variability margin that prevents the optical beam from drifting into an unstable BPP within a predetermined tolerance range.

13. The cascaded fiber laser of claim 1, further comprising:
   a second multimode fiber section coupled to the first multimode fiber section and configured to receive the optical beam, wherein the second multimode fiber section comprises a third core having a larger radius than a radius of the second core, a third cladding surrounding the third core, the third core and cladding defining a third NA that is larger than the second NA by a second margin selected to maintain the substantially stable BPP of the optical beam above a predetermined threshold stable BPP.

14. The cascaded fiber laser of claim 13, wherein the optical gain fiber section is a single-mode fiber oscillator, the first multimode fiber section is a multimode fiber amplifier, and the second multimode fiber section is a multimode optical beam delivery fiber.

15. The cascaded fiber laser of claim 14, wherein the second margin is selected so as to provide a variability margin that prevents the optical beam from drifting into an unstable BPP within a predetermined tolerance range.

16. The cascaded fiber laser of claim 15, wherein the predetermined tolerance range is based on fiber parameter manufacturing variation.

17. The cascaded fiber laser of claim 2, wherein the low optical loss is associated with excitation by the optical beam of higher order modes of the multimode fiber.

* * * * *